United States Patent
Nicolardi et al.

(10) Patent No.: US 10,679,349 B2
(45) Date of Patent: Jun. 9, 2020

(54) METHOD AND SYSTEM FOR ESTIMATING MOTION BETWEEN IMAGES, PARTICULARLY IN ULTRASOUND SPATIAL COMPOUNDING

(71) Applicant: ESAOTE S.p.A., Genoa (IT)

(72) Inventors: Paolo Nicolardi, Arenzano (IT); Paolo Semplici, Monsummano Terme (IT)

(73) Assignee: ESAOTE S.p.A., Genoa (IT)

(*) Notice: Subject to any disclaimer, the term of this patent is extended or adjusted under 35 U.S.C. 154(b) by 96 days.

(21) Appl. No.: 15/596,615

(22) Filed: May 16, 2017

(65) Prior Publication Data

US 2017/0358085 A1  Dec. 14, 2017

(30) Foreign Application Priority Data

Jun. 8, 2016 (EP) .................................... 16173446

(51) Int. Cl.
| | | |
|---|---|---|
| G06T 7/10 | (2017.01) | |
| G06T 7/33 | (2017.01) | |
| G06T 7/231 | (2017.01) | |
| G01S 15/89 | (2006.01) | |
| G01S 7/52 | (2006.01) | |

(52) U.S. Cl.
CPC ............ G06T 7/10 (2017.01); G01S 15/8995 (2013.01); G06T 7/231 (2017.01); G06T 7/337 (2017.01); G01S 7/52077 (2013.01); G06T 2207/10016 (2013.01); G06T 2207/10132 (2013.01); G06T 2207/20012 (2013.01); G06T 2207/20221 (2013.01); G06T 2207/30004 (2013.01)

(58) Field of Classification Search
CPC .................................................. G06T 7/10; G06T 7/231; G06T 7/337; G06T 2207/30004; G06T 2207/20221; G06T 2207/20012; G06T 2207/10132; G06T 2207/10016; G01S 15/8995; G01S 7/52077

See application file for complete search history.

(56) References Cited

U.S. PATENT DOCUMENTS

| 4,159,462 A | 6/1979 | Rocha et al. |
| 4,319,489 A | 3/1982 | Yamaguchi et al. |

(Continued)

FOREIGN PATENT DOCUMENTS

EP  2 886 059 A1  6/2015

OTHER PUBLICATIONS

European Search Report dated Dec. 5, 2016 which issued in European Patent Application No. 16173446.2.

(Continued)

Primary Examiner — Ming Y Hon
(74) Attorney, Agent, or Firm — Dickinson Wright PLLC

(57) ABSTRACT

Methods are provided for estimating motion between images associated with a common region of interest, the method comprising:
  providing frames including a reference frame and a target frame;
  determining a global motion vector based on a comparison of the reference and target frames;
  for a plurality of local blocks, determining local motion vectors between the reference and target frames based on the global motion vector to form globally adjusted local motion vectors;
  considering the globally adjusted local motion vectors as motion estimator.
A corresponding system is also disclosed.

18 Claims, 18 Drawing Sheets

(56) References Cited

U.S. PATENT DOCUMENTS

| | | | |
|---|---|---|---|
| 4,649,927 A | 3/1987 | Fehr et al. | |
| 5,682,205 A * | 10/1997 | Sezan | H04N 7/012 348/208.99 |
| 5,782,766 A | 7/1998 | Weng et al. | |
| 7,583,214 B2 | 9/2009 | Liu et al. | |
| 8,068,647 B2 | 11/2011 | Lin | |
| 2004/0081239 A1* | 4/2004 | Patti | H04N 19/51 375/240.16 |
| 2005/0113696 A1 | 5/2005 | Miller | |
| 2005/0232499 A1* | 10/2005 | Ha | H04N 19/53 382/236 |
| 2009/0232216 A1* | 9/2009 | Kurata | H04N 5/144 375/240.16 |
| 2011/0319760 A1* | 12/2011 | Cerofolini | A61B 5/6804 600/443 |
| 2012/0127267 A1* | 5/2012 | Zhang | G06T 7/0071 348/43 |
| 2013/0128691 A1* | 5/2013 | Martins | G01S 15/8995 367/7 |
| 2013/0188874 A1* | 7/2013 | Wu | H04N 9/3129 382/197 |
| 2014/0267800 A1 | 9/2014 | Slutsky | |
| 2017/0243328 A1* | 8/2017 | Lee | H04N 5/21 |

OTHER PUBLICATIONS

Cheng-Hsien Lin et al., "A Motion Compounding Technique for Speckle Reduction in Ultrasound Images", Journal of Digital Imaging; The Journal of the Society for Computer Applications in Radiology, Springer-Verlag, NE, vol. 23, No. 3, Jan. 7, 2009, pp. 246-257.

Kefu Xue, Ph.D., et al., "A Motion Compensated Ultrasound Spatial Compounding Algorithm", Proceedings—19$^{th}$ International Conference—IEEE/EMBS Oct. 30-Nov. 2, 1997, Chicago, IL, pp. 818-821.

* cited by examiner (a)

(b)

METHOD AND SYSTEM FOR ESTIMATING MOTION BETWEEN IMAGES, PARTICULARLY IN ULTRASOUND SPATIAL COMPOUNDING

FIELD OF THE INVENTION

The invention relates to the technical field of medical imaging, particularly ultrasound imaging, although it can find application in any field where there is the need to estimate and/or compensate motion between images, for example in video compression, video-object segmentation, video content analysis and frame interpolation. It can also find application in any field where there is the need to find corresponding points between two images or video frames, for example in image registration or stereo correspondence in 3D.

BACKGROUND OF THE INVENTION

Ultrasound systems exist today that utilize a variety of techniques for processing ultrasound signals to generate information of interest.

The different techniques have been developed for enhancing the quality of the image information which can be made available for diagnosis.

One of the problems to be solved in diagnostic imaging and also in ultrasound imaging relates to increasing image resolution, eliminating artifacts, shadows, increasing edge detail and suppressing speckle.

One known technique that allows to achieve these results is the so called compound imaging.

Spatial compounding is an imaging technique in which a number of ultrasound images of a given target that have been obtained from multiple vantage points or angles are combined into a single compounded image by combining the data received from each point in the compound image target which has been received from each angle. Examples of spatial compounding may be found in U.S. Pat. Nos. 4,649,927; 4,319,489; and 4,159,462. Real time spatial compound imaging is performed by rapidly acquiring a series of partially overlapping component images or frames from substantially independent spatial directions, utilizing an array transducer to implement electronic beam steering and/or electronic translation of the component frames. The component frames are combined into a compound image by summation, averaging, peak detection, or other combinational means. The acquisition sequence and formation of compound images are repeated continuously at a rate limited by the acquisition frame rate, that is, the time required to acquire the full complement of scanlines over the selected width and depth of imaging.

The compounded image typically shows lower speckle and better specular reflector delineation than conventional ultrasound images from a single viewpoint. Speckle is reduced (i.e. speckle signal to noise ratio is improved) by the square root of N in a compound image with N component frames, provided that the component frames used to create the compound image are substantially independent and are averaged.

Conventional approaches to implementing spatial compounding such as that shown in U.S. Pat. No. 4,649,927 typically use a large FIFO memory buffer to temporarily store the component frames that will be compounded (typically by summing and normalization) to form the final compounded image.

Standard ultrasound images compounding is generally provided using images acquired with different steering angles. Each image leads on a fixed line of sight (LOS) angle step. Resulting composed image shows double side discontinuities due to incomplete areas overlapping. To avoid this it is necessary to reduce the field of view of the output Image or heavily filter it.

As compound images are essentially based on the combination of frames taken at different times, when the object under investigation moves, the resulting compounded image contains artifacts. To reduce such artifacts motion compensation techniques can be used.

Motion estimation in ultrasound imaging is a hard problem due to the characteristics of ultrasound images that suffer from poor signal to noise ratio and to possible presence of large flat regions especially in the deep regions. In addition, the local difference between subsequent frames is normally very high, making the motion estimation even more difficult.

Several yes of motion compensation techniques are available in the prior art. One example is the classic block matching estimation. Classical approaches to motion estimation, however, do not prove to be satisfactory in ultrasound compound imaging when motion between frames (e.g., due to moving targets or to the movement of the probe) exist.

SUMMARY

In accordance with embodiments herein, a method is provided for estimating motion between images. The method comprises the operations of:

providing frames, hereinafter also referred as images, for example in the form of ultrasound data acquired by an ultrasound probe having a transducer array, the frames including a reference frame and a target frame associated with a common region of interest;

estimating a global motion vector based on a comparison of the reference and target frames;

for a plurality of blocks, estimating local motion vectors between the reference and target frames based on the global motion vector to form globally adjusted local motion vectors.

The globally adjusted local motion vectors can be output as the result of motion estimation or can be used for further processing.

In accordance with embodiments herein, motion-compensated images, particularly compound images, are generated by combining the reference and target frames based on the globally adjusted local motion vectors.

In accordance with embodiments herein, the estimating operation includes calculating a desired relation between blocks in the reference and target frames.

According to an embodiment the estimating global motion vector includes calculating a function that correlate a macro-block in the reference frame with a plurality of displacements of the macro-block in the target frame and choosing as global motion vector the displacement for which the function is optimal. A macro-block (or global block or big block) is a block corresponding to a substantial majority of the frame used to estimate global motion as exemplary shown in FIG. 6b.

The estimating local motion vectors includes calculating a function that correlate each local block in which the reference frame is partitioned with a plurality of displacement of the same block in the target frame and choose as local motion the displacement for which the function is optimal.

A local block (or small block or simply block) is a block corresponding to a partition of the frame used to estimate local motion (see FIG. 6a).

In accordance with embodiments herein, the estimating global motion vector operation includes calculating sum of absolute differences (global SAD) or normalized cross-correlation (global NCC) between a macro-block in the reference frame and a plurality of displacement of this macro-blocks in the target frame and choose, as global motion, the displacement for which the function is optimal i.e. the global SAD is minimum or global NCC is maximum.

According to another embodiment, the estimating local motion vectors operation includes calculating sum of absolute differences (local SAD) or normalized cross-correlation (local NCC) between each local block in the reference frame and a plurality of displacements of this block in the target frame; then the function is adjusted by a term that depends on the distance between the previous estimated global motion vector and the candidate displacement and becomes the target function to estimate the local motion vector.

According to another embodiment, the estimating global motion vector operation includes calculating sum of absolute differences (local SAD) or normalized cross-correlation (local NCC) between a macro-block in the reference frame and a plurality of displacements of this block in the target frame; then the function is adjusted by a term that depends on the distance between the null displacement and the candidate displacement and becomes the target function to estimate the global motion vector.

In accordance with embodiments herein, a method is provided for performing compound imaging. Spatial compounding is a method in which a certain number of subsequent frames are acquired with different insonation angle and combined; in general each frame is insonated according to a periodic sequence of N different insonation angles.

The method comprises the operations of:

acquiring frames of ultrasound data at an ultrasound probe having a transducer array. Each time a new frame is acquired, within the present disclosure, the current frame is named target frame and the previous one is named reference frame. It can obviously considered also the other way round;

estimating a global motion vector based on a comparison of the reference and target frames;

for a plurality of blocks, estimating local motion vectors between the reference and target frames based on the global motion vector to form globally adjusted local motion vectors;

combining the reference frame and the previous N−1 motion-compensated target frames to form a compound image.

An embodiment relates to a computer product directly loadable into the memory of a digital computer and comprising software code portions for performing the method according to any of the preceding claims when the product is run on a computer.

In accordance with embodiments herein, an ultrasound system is provided that comprises:

an ultrasound probe having a transducer array to acquire ultrasound data;

a beamformer to form frames from the ultrasound data, the frames including a reference frame and a target frame associated with a common region of interest;

circuitry configured to:

estimate a global motion vector based on a comparison of the reference and target frames;

for a plurality of blocks, estimate local motion vectors between the reference and target frames based on the global motion vector to form globally adjusted local motion vectors;

combining the reference frame and the previous N−1 motion-compensated target frames to form a compound image.

The circuitry typically comprises one or more processors that, when executing program instructions, are configured to perform at least one of the estimate, determine, adjust and combine operations.

According to an embodiment, the estimating operation performed by the circuitry includes calculating a desired relation between blocks in the reference and target frames.

More specifically the estimating global motion vector operation includes calculating sum of absolute differences (local SAD) or normalized cross-correlation (local NCC) between a macro-block in the reference frame and a plurality of displacements of this block in the target frame; then the function is adjusted by a term that depends on the distance between the null displacement and the candidate displacement and becomes the target function to estimate the global motion vector.

In accordance with embodiments herein, the estimating local motion vectors operation includes calculating sum of absolute differences (local SAD) or normalized cross-correlation (local NCC) between each local block in the reference frame and a plurality of displacements of this block in the target frame; then the function is adjusted by a term that depends on the distance between the previous estimated global motion vector and the candidate displacement and becomes the target function to estimate the local motion vector.

According to another embodiment one or both the target functions to estimate global and local motion vectors are modified by adding a term that depends on an algorithm. This algorithm detects some kind of unnatural pattern of motion typically due to the varying insonation angle used for subsequent frames in spatial compounding.

In this embodiment the target functions are modified by adding a term that is the composition of a constant provided by the user with the result of the algorithm. Particularly an appropriate number of raw motion values, regarding the current and one or more past frame, are processed to detect some characteristics of the signal that are not present in a natural motion pattern.

Further improvements of the invention will form the subject of the dependent claims.

BRIEF DESCRIPTION OF THE DRAWINGS

Further improvements and characteristics of the embodiments herein will be clear from the following description of some non-limiting embodiments schematically shown in the annexed figures wherein:

FIG. 6a shows an example of local blocks partition of the reference frame used to estimate local motion while FIG. 6b shows an example of macroblock used to estimate the global motion in accordance with embodiments herein.

DETAILED DESCRIPTION

While multiple embodiments are described, still other embodiments of the described subject matter will become apparent to those skilled in the art from the following detailed description and drawings, which show and describe illustrative embodiments of disclosed inventive subject matter. As will be realized, the inventive subject matter is capable of modifications in various aspects, all without departing from the spirit and scope of the described subject matter. Accordingly, the drawings and detailed description are to be regarded as illustrative in nature and not restrictive.

Figure 1:
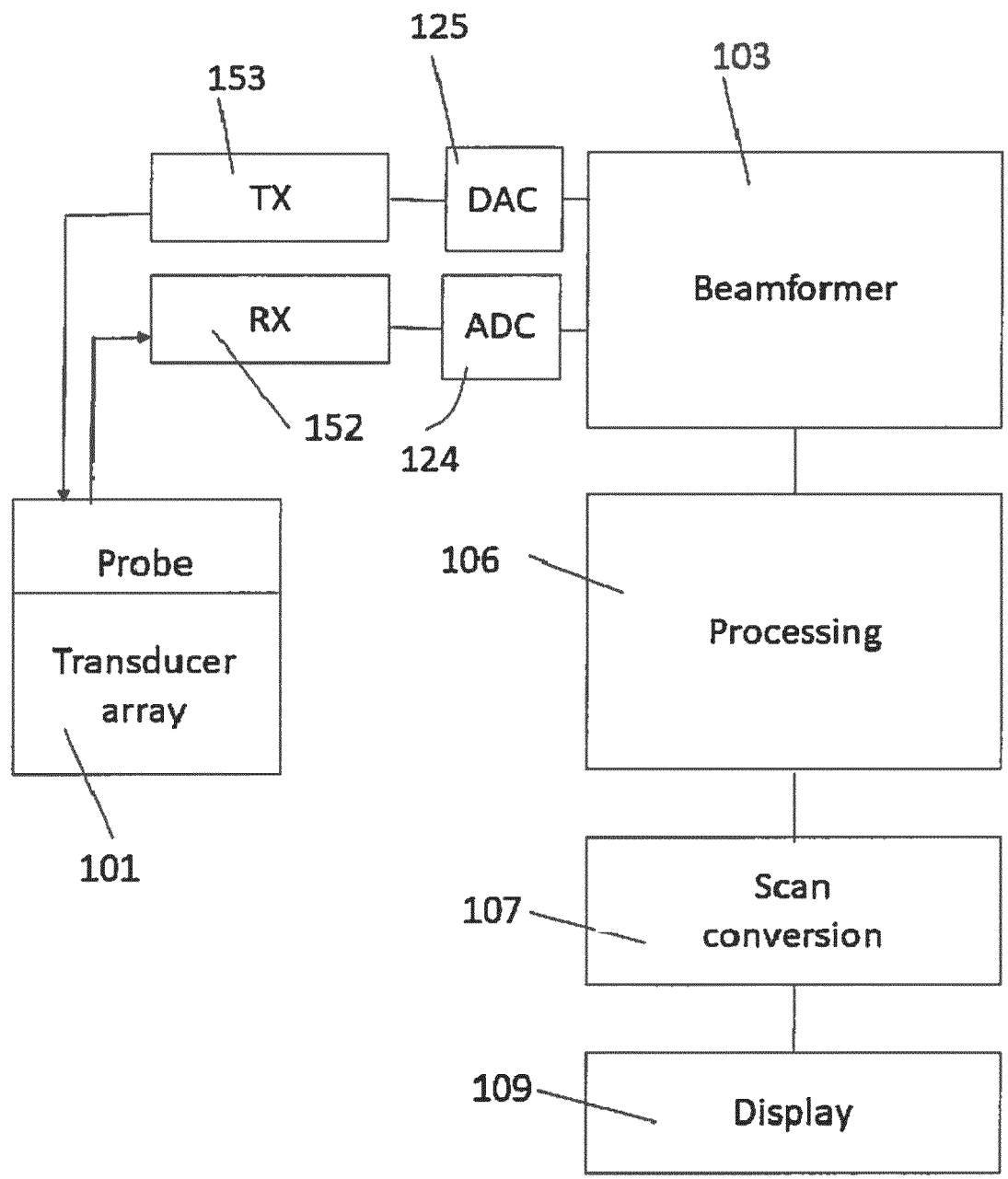
FIG. 1 illustrates a block diagram of an ultrasound system.

FIG. 1 illustrates a high-level block diagram of an ultrasound system implemented in accordance with embodiments herein. Portions of the system (as defined by various functional blocks) may be implemented with dedicated hardware, analog and/or digital circuitry, and/or one or more processors operating program instructions stored in memory. Additionally or alternatively, all or portions of the system may be implemented utilizing digital components, digital signal processors (DSPs) and/or field programmable gate arrays (FPGAs) and the like. The blocks/modules illustrated in FIG. 1 can be implemented with dedicated hardware (DPSs, FPGAs, memories) and/or in software with one or more processors.

The ultrasound machine for acquiring diagnostic images comprises a probe 101 provided with an array of electroacoustic transducers intended to transform excitation electric signals sent thereto into ultrasound acoustic signals and vice versa the received acoustic signals into corresponding electric signals.

A transmit section and a receive section 152, 153 are connected alternatively one another with the probe to provide to each individual transducer an excitation signal of the corresponding ultrasound pulse and to receive the electric signal corresponding to an acoustic pulse that has hit the transducer.

The transmit signals to the transducers are each one sent in an independent manner through a dedicated channel or by a multiplexer to an digital analog converter 125 that generate signals at a predetermined sampling rate and it provides analog excitation signals to each transducer/channel.

Digital transmit signals are subjected to a processing by a so called beamforming processor 103 that carries out a proper delay of the transmission signals of each channel in order to selective concentrate ultrasound energy in a narrow line, zone or eventually in the whole body region to be investigated depending on the adopted image formation scheme.

The receive signals of the transducers are each one sent in an independent manner through a dedicated channel or by a multiplexer to an analog digital converter 124 that samples said signals with a predetermined sampling rate and it provides output digitized receive signals of each transducer/channel.

Therefore digitized signals are subjected to a processing by a so called beamforming processor 103 that carries out the time alignment of the contributions of the receive signal of each channel correspondingly to the travel time of the signal reflected by a predetermined reflection point from said reflection point to the corresponding transducer.

Since the individual transducers of the array provided on the probe have positions different from each other, they necessarily have different distances from the reflection point and therefore the echo signal deriving from such point reaches each individual reflector in a different moment.

The focusing process performs the time re-alignment of the contributions of the receive signal of each transducer deriving from the same reflection point and therefore to sum together such contributions in a coherent manner.

The focusing process, in dependence of the transmission scheme adopted, may concern a narrow line, a zone or the whole investigated body region.

One or more processors 106 perform various processing operations as described herein before the signal is ready to be scan converted in 157 and displayed (109).

Figure 2:
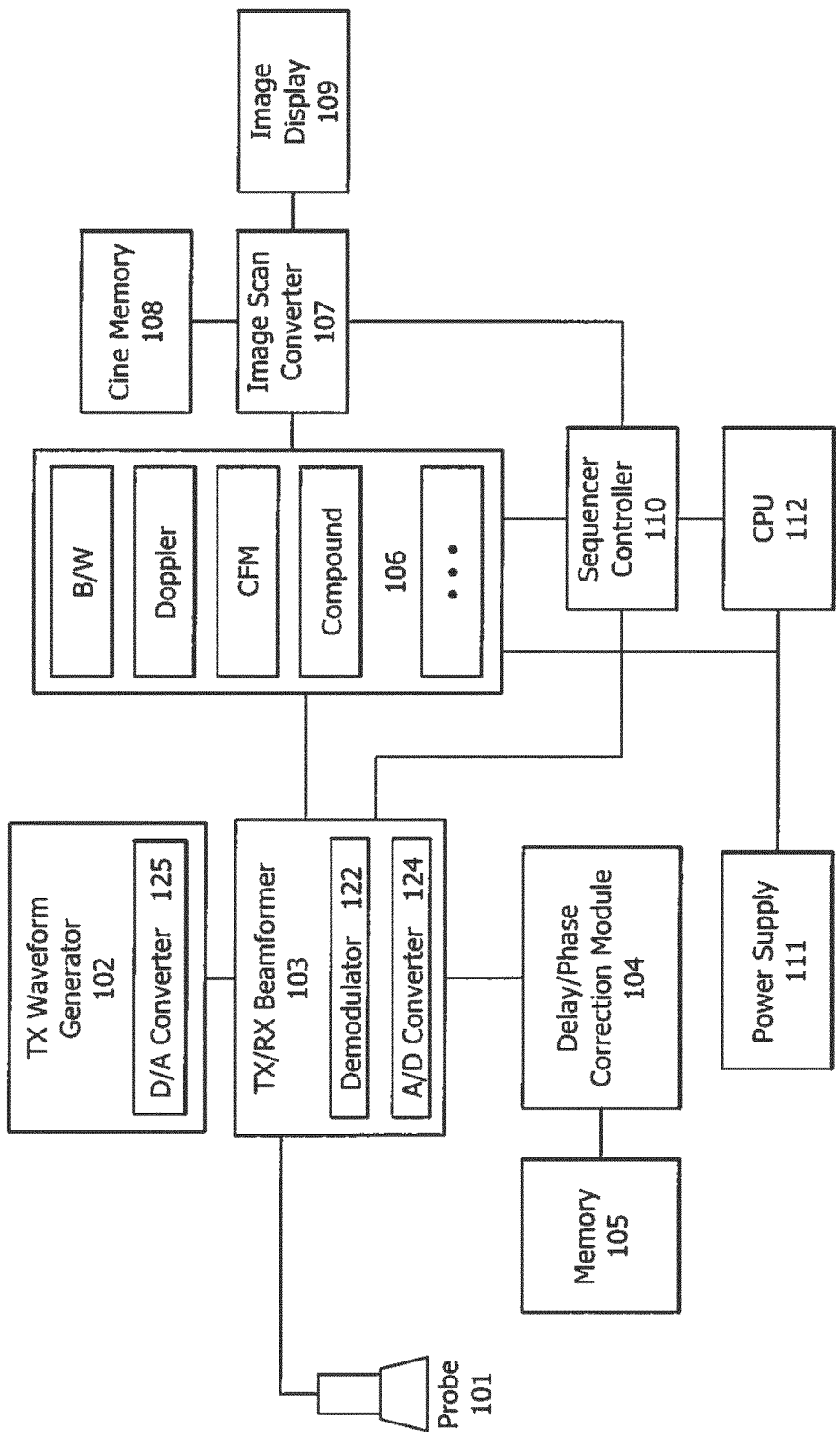
FIG. 2 illustrates a more detailed block diagram of the ultrasound system of FIG. 1.

FIG. 2 shows more details of the ultrasound system of FIG. 1. The probe 101 may include various transducer array configurations, such as a one dimensional array, a two dimensional array, a linear array, a convex array and the like. The transducers of the array may be managed to operate as a 1D array, 1.25D array, 1.5D array, 1.75D array, 2D array, 3D array, 4D array, etc.

The ultrasound probe 101 is coupled over a wired or wireless link to a beamformer 103. The beamformer 103 includes a transmit (TX) beamformer and a receive (RX) beamformer that are jointly represented by TX/RX beamformer 103. The TX and RX portions of the beamformer may be implemented together or separately. The beamformer 103 supplies transmit signals to the probe 101 and performs beamforming of "echo" receive signals that are received by the probe 101.

A TX waveform generator 102 is coupled to the beamformer 103 and generates the transmit signals that are supplied from the beamformer 103 to the probe 101. The transmit signals may represent various types of ultrasound TX signals such as used in connection with B-mode imaging, Doppler imaging, color Doppler imaging, pulse-inversion transmit techniques, contrast-based imaging, M-mode imaging and the like. Additionally or alternatively, the transmit signals may include single or multiline transmit, narrow beams transmit, zone transmit, broad beams transmit, plane-waves transmit, shear waves transmit and the like.

The beamformer 103 performs beamforming upon received echo signals to form beamformed echo signals in connection to pixel locations distributed across the region of interest. For example, in accordance with certain embodiments, the transducer elements generate raw analog receive signals that are supplied to the beamformer. The beamformer adjusts the delays to focus the receive signal along one or more select receive beams and at one or more select depths within the region of interest (ROI). The beamformer adjusts the weighting of the receive signals to obtain a desired apodization and profile. The beamformer applies weights and delays to the receive signals from individual corresponding transducers of the probe. The delayed, weighted receive signals are then summed to form a coherent receive signal.

The beamformer 103 includes (or is coupled to) an A/D converter 124 that digitizes the receive signals at a select sampling rate. The digitization process may be performed before or after the summing operation that produces the coherent receive signals. The beamformer also includes (or is coupled to) a demodulator 122 that demodulates the receive signals to remove the carrier waveform. Once the receive signals are demodulated and digitized, complex receive signals are generated that include I,Q components (also referred to as I,Q data pairs). The I,Q data pairs are saved as image pixels in memory. The I,Q data pairs, defining the image pixels for corresponding individual locations along corresponding lines of sight (LOS) or view lines. A collection of image pixels (e.g., I,Q data pairs) are collected over time and saved as 2D frames and/or 3D volumes of image data. The image pixels correspond to tissue and other anatomy within the ROI.

Optionally, a dedicated sequencer/timing controller 110 may be programmed to manage acquisition timing which can be generalized as a sequence of firings aimed at select reflection points/targets in the ROI. The sequence controller 110 manages operation of the TX/RX beamformer 103 in connection with transmitting ultrasound beams and measuring image pixels at individual LOS locations along the lines of sight. The sequence controller 110 also manages collection of receive signals.

In accordance with embodiments herein the beamformer may be configured to acquire a main frame and a secondary frame of ultrasound data at the transducer array, the main and secondary frames at least partially overlapping one another.

One or more processors 106 and/or CPU 112 perform various processing operations as described herein.

For example, the processor 106 executes a B/W module to generate B-mode images. The processor 106 and/or CPU 112 executes a Doppler module to generate Doppler images. The processor executes a Color flow module (CFM) to generate color flow images. The processor 106 and/or CPU 112 may implement additional ultrasound imaging and measurement operations. Optionally, the processor 106 and/or CPU 112 may filter the first and second displacements to eliminate movement-related artifacts.

An image scan converter 107 performs scan conversion on the image pixels to convert the format of the image pixels from the coordinate system of the ultrasound acquisition signal path (e.g., the beamformer, etc.) and the coordinate system of the display. For example, the scan converter 107 may convert the image pixels from polar coordinates to Cartesian coordinates for frames.

A cine memory 108 stores a collection of frames over time. The frames may be stored formatted in polar coordinates, Cartesian coordinates or another coordinate system.

An image display 109 displays various ultrasound information, such as the frames and information measured in accordance with embodiments herein. The display 109 displays the ultrasound image with the region of interest shown.

A control CPU module 112 is configured to perform various tasks such as implementing the user/interface and overall system configuration/control. In case of fully software implementation of the ultrasound signal path, the processing node usually hosts also the functions of the control CPU.

A power supply circuit 111 is provided to supply power to the various circuitry, modules, processors, memory components, and the like. The power supply 111 may be an A.C. power source and/or a battery power source (e.g., in connection with portable operation).

The processor 106 and/or CPU 112 may be configured to execute a compound module to generate compound images.

Spatial compounding is an imaging technique in which a number of ultrasound images of a given target that have been obtained from multiple vantage points or angles are combined into a single compounded image by combining the data received from each point in the compound image target which has been received from each angle. Examples of spatial compounding may be found in U.S. Pat. Nos. 4,649,927; 4,319,489; and 4,159,462. Real time spatial compound imaging is performed by rapidly acquiring a series of partially overlapping component frames from substantially independent spatial directions, utilizing an array transducer to implement electronic beam steering and/or electronic translation of the component frames. The component frames are combined into a compound image by summation, averaging, peak detection, or other combinational means. The acquisition sequence and formation of compound images are repeated continuously at a rate limited by the acquisition frame rate, that is, the time required to acquire the full complement of scanlines over the selected width and depth of imaging.

The compounded image typically shows lower speckle and better specular reflector delineation than conventional ultrasound images from a single viewpoint. Speckle is reduced (i.e. speckle signal to noise ratio is improved) by the square root of N in a compound image with N component frames, provided that the component frames used to create the compound image are substantially independent and are averaged.

Conventional approaches to implementing spatial compounding such as that shown in U.S. Pat. No. 4,649,927 typically use a large FIFO memory buffer to temporarily store the component frames that will be compounded (typically by summing and normalization) to form the final compounded image.

Standard ultrasound images compounding is generally provided using images acquired with different steering angles. Each image leads on a fixed line of sight (LOS) angle step. Resulting composed image shows double side discontinuities due to incomplete areas overlapping. To avoid this it is necessary to reduce the field of view of the output image or heavily filter it.

In accordance with embodiments herein the compound processor 106 is configured to execute the program instructions to: combine the main and secondary frames to form a compound image; and align at least one of the main frame boundaries for the main frame with one of the lines of view of the secondary frame.

Figure 3:
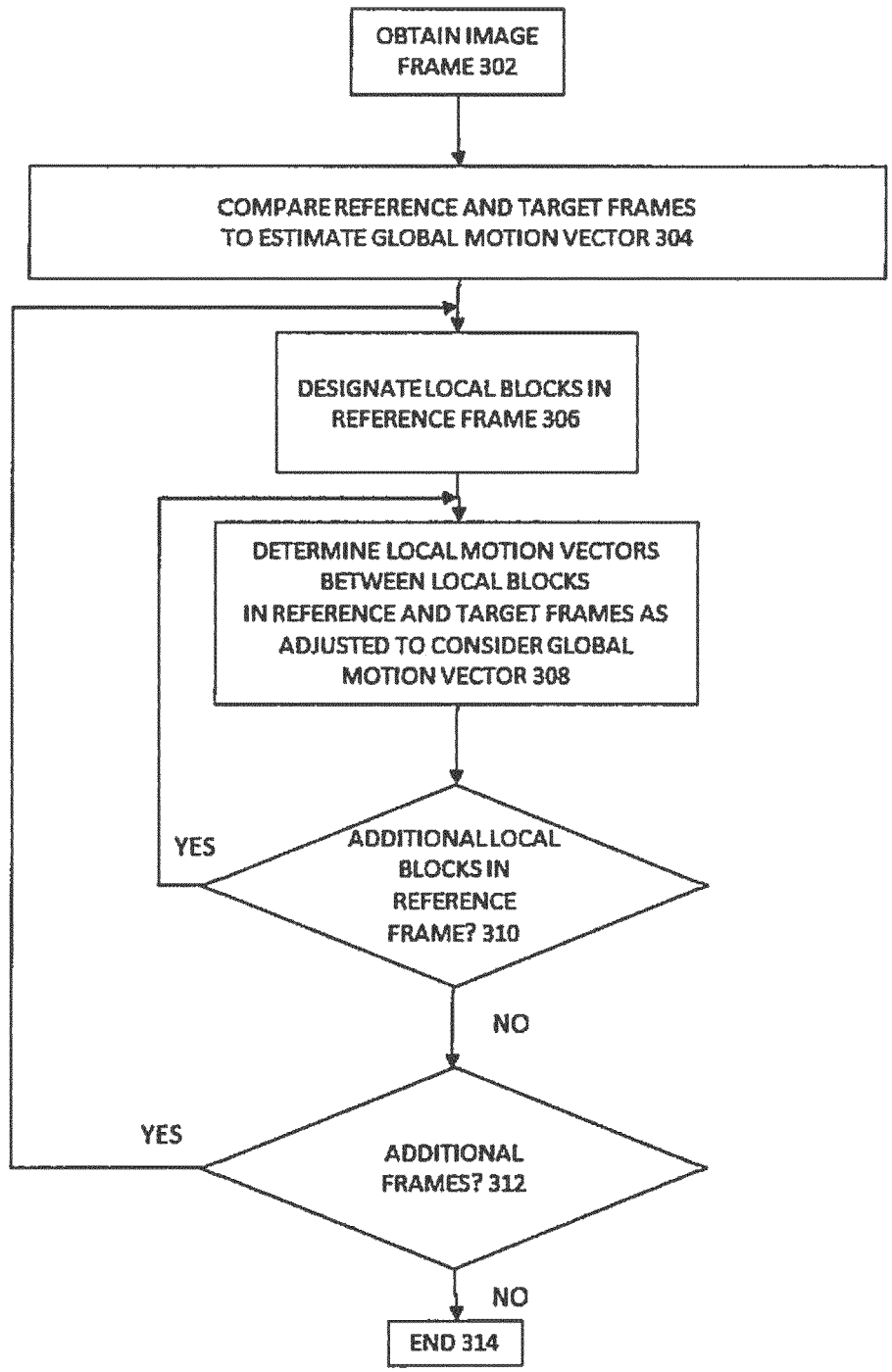
FIG. 3 schematically illustrates a process for generating a motion corrected compound image in accordance with embodiments herein.
Figure 4:
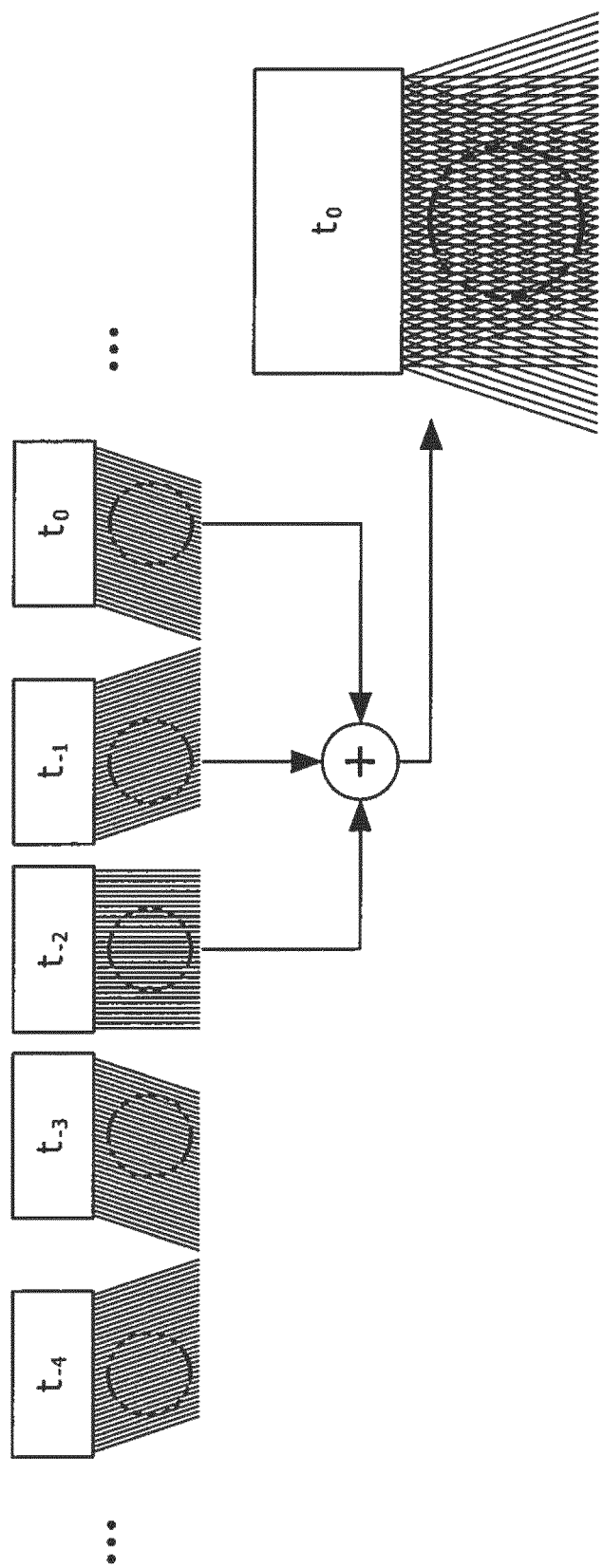
FIG. 4 schematically illustrates how three images are compounded without motion compensation.
Figure 5:
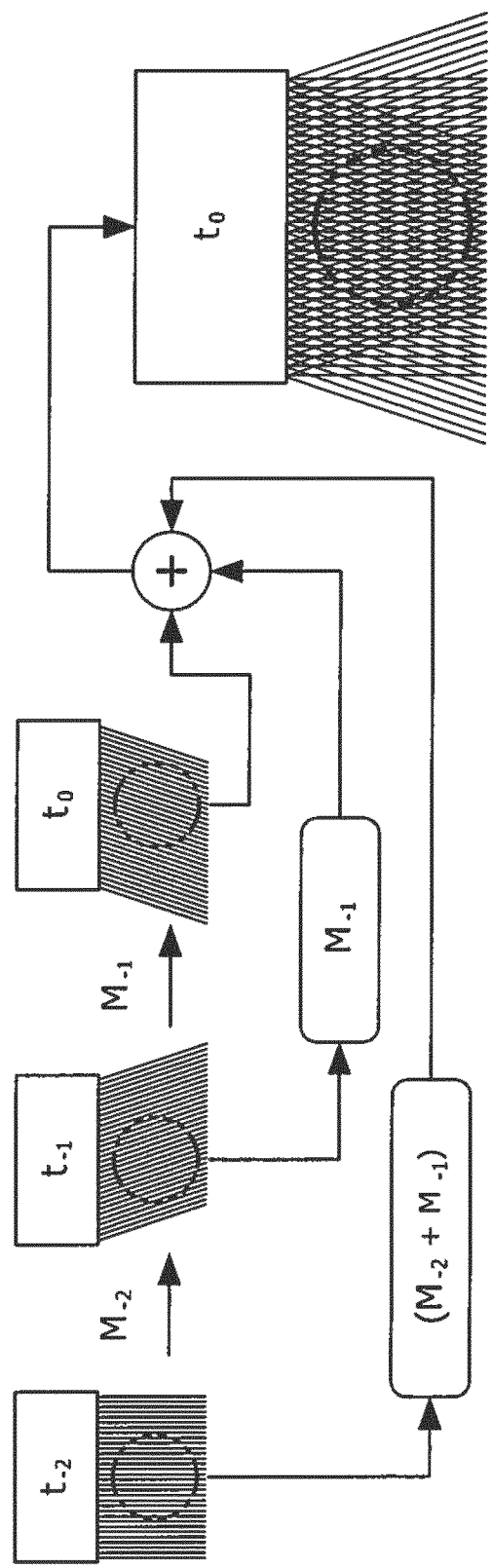
FIG. 5 schematically illustrates three images to be compounded in connection with embodiments herein.

FIG. 3 illustrates a process for generating a motion corrected compound image in accordance with aspects herein. At block 302, one or more processors and/or beamforming circuitry manage operation of the ultrasound probe to acquire frames of ultrasound data at the ultrasound probe. The frames includes a series of at least two frames associated with a common region of interest. For example, the series of frames may include more than two frames. FIG. 4 shows an example gf how three frames can be combined to obtain a spatially compounded image. Spatial compounding is a method in which a certain number of subsequent frames are acquired with different insonation angle and combined to obtain an image having reduced speckle noise content; more in general each frame is insonated according to a periodic sequence of N different insonation angles and the output frame is composed from the last N acquired frames. As the frames are acquired at different time instants, due to probe/tissue motion, the combined image presents artifacts. For this reason, before making the composition, an embodiment provides for estimating the motion from the last frame to the current one to produce N−1 motion-compensated frames using the last N−1 estimated motion field as shown in FIG. 5 for example with N=3. In this example the last frame, indicated with to in the figure, is combined with a motion-compensated replica of the last two previous frame ($t_{-1}, t_{-2}$). The quantity $M_{-i}$ represents an estimation of motion of the pixels of two subsequent frames, generally in the form of a vector (in case of a rigid movement) or more in general of vectors for each pixel of the image. Any previous frame can thus be motion compensated with reference to the last frame by accumulating the amount of motion between subsequent frames. In the figure frame $t_{-2}$ is motion compensated considering motion between frame $t_{-2}$ and $t_{-1}$ and from frame $t_{-1}$ to frame $t_0$. In this way motion vectors can be advantageously partially re-utilized in the calculation, although a full motion analysis can obviously be performed from any frame of the sequence and the actual one without the need to use intermediate values.

For making such compensation, motion between pixels of the frames is to be estimated. To such extent, one or more processors and/or a motion circuit selects a reference frame and a target frame, and estimates a motion vector based on a motion comparison thereof. As explained herein, the frames are compared with one another to estimate motion vectors (globally adjusted local motion vectors). The globally adjusted local motion (GALM) vectors are used to correct the motion when combining the frames. By way, the ultrasound probe may acquire a series of N frames, wherein frames #1 and #2 are compared for relative motion therebetween, frames #2 and #3 are compared for relative motion therebetween, etc. Optionally, frames may be compared that are not acquired successively in time. For example, frame #3 may be compared with frames #5, #7, #9, etc. Additionally or alternatively, frames that are compared may be associated with a common point/state in a cardiac cycle. For example, frames that correspond to the peak of the R-wave during successive/different cardiac cycles may be compared. Additionally or alternatively, frames that correspond to a select point in the systolic or diastolic phase of the cardiac cycle may be compared.

For convenience of reference, throughout the present discussion, the frames that are compared may be referred to as "current" or "reference" or "main" frames, "previous" or "target" or "secondary" frames, and/or other characterizing terms to distinguish between the frames. The frames to be compared may occur at slightly different points in time, during different cardiac cycles, or otherwise temporally offset from one another. Optionally, the frames to be compared may be acquired simultaneously (or substantially simultaneously), such as with an ultrasound probe that implements multiline acquisition to obtain physically adjacent frames (e.g., multiple adjacent slices). The frames to be compared are associated with a common region of interest, whether acquired along a common scan plane at different points in time or acquired simultaneously along adjacent scan planes.

By way of example, the motion vector may be estimated by calculating a desired relation, hereinafter also called target function or cost function, between one or more blocks of pixels in the reference and target frames. The blocks in the reference and target frames may be identified in various manners. For example, the block may corresponding to a substantial majority of the frames (e.g., 100%, 80%, 60% of the entire field of view acquired in a frame). Optionally, the block may be designated based in part on the anatomy being scanned, based on the examination protocol, based on the imaging modality, and the like.

The desired relation may be based on various criteria. For example, the desired relation may represent a best match between a reference block in the reference frame and a candidate displacement of the block in the target frame. For example, a sum of absolute differences (SADs) may be calculated between the reference block in the reference frame and the candidate displacement of the block in the target frame, based on the following equation:

$$SAD(i, j) = \sum_{(x,y) \in W} |I_1(x, y) - I_2(x+i, y+j)| \qquad \text{(eq. 1)}$$

In the above equation, the parameter $I_1(x,y)$ represents the intensity of a pixel at coordinate (x,y) in the reference frame, and the parameter $I_2(x+i,y+j)$ represents the intensity of a pixel at coordinate (x+i,y+j) in the target frame. The sum of the absolute value of the difference in intensities $I_1$ and $I_2$ are calculated by comparing a block of pixels W at location (x,y) in the reference frame to a corresponding block of pixels W shifted by a quantity (i,j).

Figure 6:
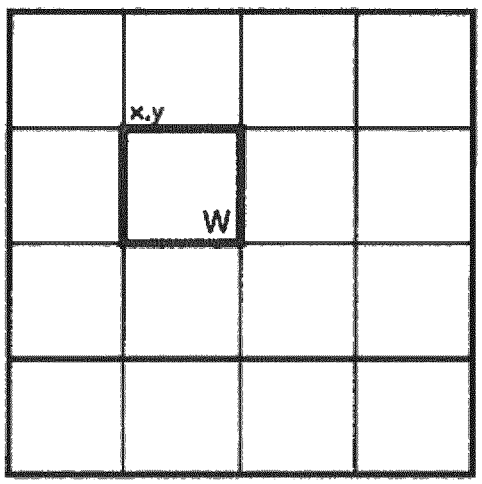
FIG. 6 shows an exemplary reference and target frame to be used for block-matching motion estimation in accordance with embodiments herein.
Figure 6:
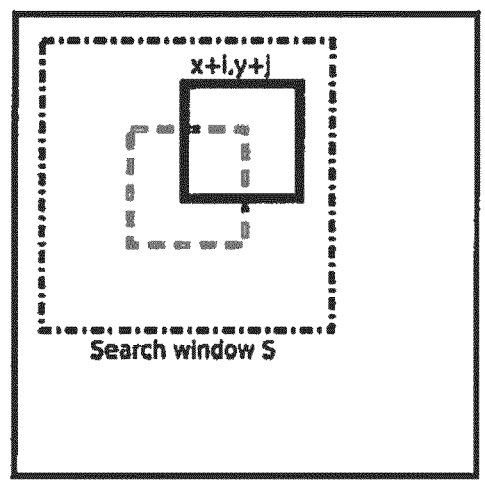
Figure 6:
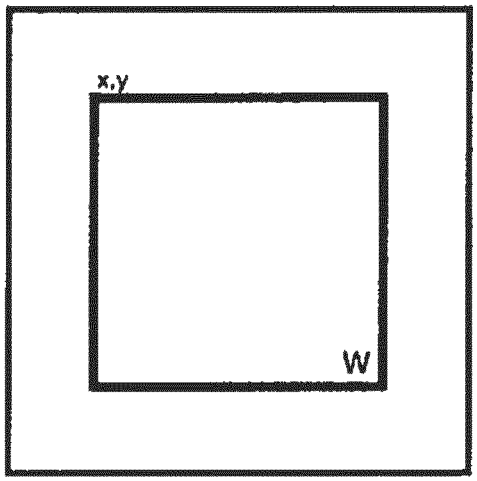
Figure 6:
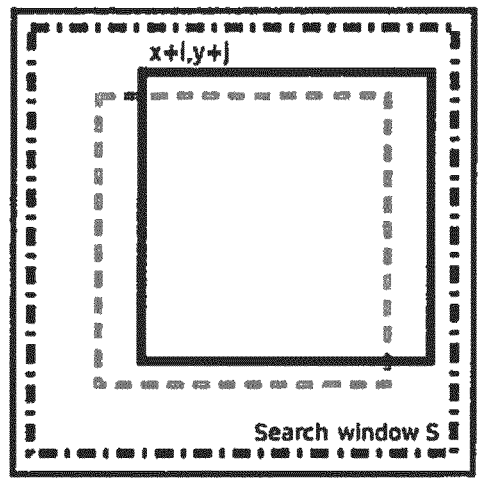

Referring to the FIG. 6, the search window (S) located in the target frame shows all possible (i,j) in which to compute the target function.

With reference to the figure, with (x+i, y+j) it is identified a block W of pixels which is located within the search window S in a position which is X-shifted by i and y-shifted by j pixels with respect to the block identified by (x, y) in the reference frame (with broken lies in the target frame). (x, y) may be the Cartesian coordinate of a corner pixel of the block W or of any other pixel, such as, for example, the central one.

In accordance with aspects herein, SAD values are calculated in accordance with all or a selection portion of the pixels in the reference frame. For example, a SAD value may be calculated for each pixel location (x, y) in the block of the reference frame utilizing the above equation.

Once SAD values are calculated for each block of interest W in the reference frame, a motion vector is determined therefrom for such a block. The motion vector may be determined based on one or more SAD values that have a desired characteristic. For example, the process may review all or a portion of the SAD values and determine a minimum SAD value, or a SAD value that has some other characteristic of interest.

The SAD value, that has the characteristic of interest, is then used to estimate the motion vector. For example, for a specific block W in the reference frame, among the SAD values calculated for each (i, j) couple, i.e. for each block W located in the search window S at location (i, j), the SAD (i, j) having minimum value identify the indexes (i, j), i.e the position of block W in the target frame and thus the motion vector.

Optionally, a motion estimation process may be used other than the sum of the absolute differences. For example, other techniques for calculating global motion estimation may include a cross correlation, normalized cross correlation, and the like. In case of a normalized cross correlation, equation 1 may become:

$$NCC(i, j) = \frac{\sum_{(x,y) \in W} |I_1(x, y) \cdot I_2(x+i, y+j)|}{\sqrt{\sum_{(x,y) \in W} I_1(x, y)^2 \cdot \sum_{(x,y) \in W} I_2(x+i, y+j)^2}} \quad \text{eq. (2)}$$

In this case, i, j values can be advantageously determined calculating the maximum value of correlation instead of a minimum SAD.

Motion estimation can be performed on blocks W having any dimension. If such dimension corresponds to a substantial majority of the frames (e.g., 100%, 80%, 60% of the entire field of view acquired in a frame), the motion that is estimated is a global motion, i.e. a rigid movement of almost all the pixels of the frames. As rotation and non-rigid motion of part of the pixel of a frame are normally present, motion estimation is improved using small blocks, i.e. performing local motion estimation which is able to follow local deformation.

Embodiments provide for a globally adjusted local motion estimation. To such extent, at 304 the processor or processors and/or a motion circuit estimate a global motion vector between frames. This is done, for example, performing block matching as seen above on a large block of pixels W as wide as the full reference frame or as a substantial part of the frame. Boundaries are typically excluded as well as zones with little significance thereof, for example because particularly noisy, but still considering a large amount of pixels, typically not less than 60%, more typically not less than 80% of the pixels forming the whole frame.

Once global motion vector ($i_{global}$, $j_{global}$) is estimated, at 306, one or more processors and/or a local motion (LM) circuit designates a plurality of local blocks in the reference frame. By way of example, a block may be an N×N matrix of pixel elements (e.g., 8×8, 16×16, etc.).

At 308, one or more processors and/or the local motion (LM) circuit determines, for each of the local blocks, local motion vectors between a current block in the reference frame and the target frame within a search window S.

To obtain a globally adjusted local motion estimation, at 308 global motion is taken into consideration upon performing the local motion estimation, i.e. global motion is transformed in a parameter appearing in the target function used for determining the best match between reference block and all candidate displacements of this block in the target frame. An example may be a distance relation between the candidate displacement of the block (i, j) and the global motion vector ($i_{global}$, $j_{global}$).

That means that the local SAD computed between each block W in the reference frame and all candidate displacements within the search window S in the target frame is corrected by a quantity that takes into account the global motion vector to obtain a new target function.

A possible form for the target function is $$E(i,j) = SAD_{LOCAL}(i,j) + k\_dist \cdot distance((i,j), (i_{global}, j_{global})) \quad \text{eq(3)}$$

Instead of a SAD, a NCC or any other cost function can be used as seen above.

k_dist is a constant based on user input typically adjusted empirically or automatically calculated upon experimental data while distance is a geometrical distance between points (i, j) and ($i_{global}$, $j_{global}$).

If k_dist is small the only relevant term is the SAD and, at the limit with k_dist=0, this is equivalent to the block-matching algorithm on the small blocks.

If k_dist is big the only relevant term is the distance and, at the limit with k_dist->∞, this is equivalent to the block-matching algorithm on the big block.

In the mid of these two extreme situations k_dist manages the trade-off between the two terms.

From another point of view, how much a local estimation can move away from estimated global motion depends on how much motion estimation improves; the equation (3) and the two terms forming it determine that:

1) When the local SAD is noisy there is a small difference from the point in which SAD is minimum and his neighboring; in this case it is the distance term that determines the point in which E(i,j) is optimal; from another point of view, the first term is not able to move the minimum of E from the point corresponding to the global motion; in other word the global motion "wins".

2) When the local SAD contains much information, there is a big difference from the point in which SAD is minimum and his neighboring; in this case it is the term SAD that determines the point in which E(i,j) is optimal; from another point of view, the second term is not able to move the minimum of E from the point corresponding to the local motion; in other word the local motion "wins".

Returning to FIG. 3, the operations at 308 are repeated for multiple blocks in the reference frame. For example, when using a SAD calculation to determine the local motion, the SAD operation of equation (3) is repeated for each block in the reference frame. Upon the completion of the eq 3 calculation at 308, a globally corrected SAD value is obtained for each local block. The eq 3 values represent the target function for each candidate displacement of an associated local block. Hence, at the completion of the calculation at 308, a globally corrected local motion vector is known for each local block in the reference frame.

At 310, one or more processors determine whether additional blocks exist in the reference frame for which the process is to determine GALM vectors. If so, flow returns to 308. If not, flow advances to 312.

At 312, one or more processors determine whether additional frames exist that are to be analyzed for motion correction. If so, flow returns to 304. If not, flow advances to 314.

One or more processors may then combine the reference and target frames based on the globally adjusted local motion vectors to form a compound image.

Figure 7:
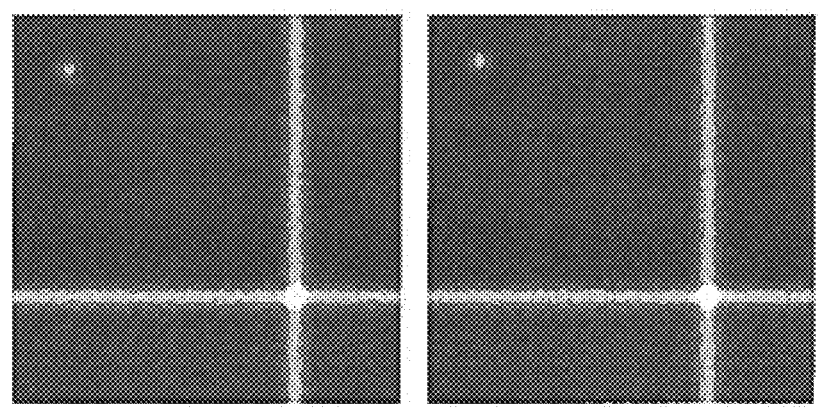
FIG. 7 shows two synthetic images having a circle in different location.

The following example shows the operations in a visual way with reference to the two synthetic images shown in FIG. 7 which differentiate only in the position of the circle on the top-left and the noise.

Figure 8:
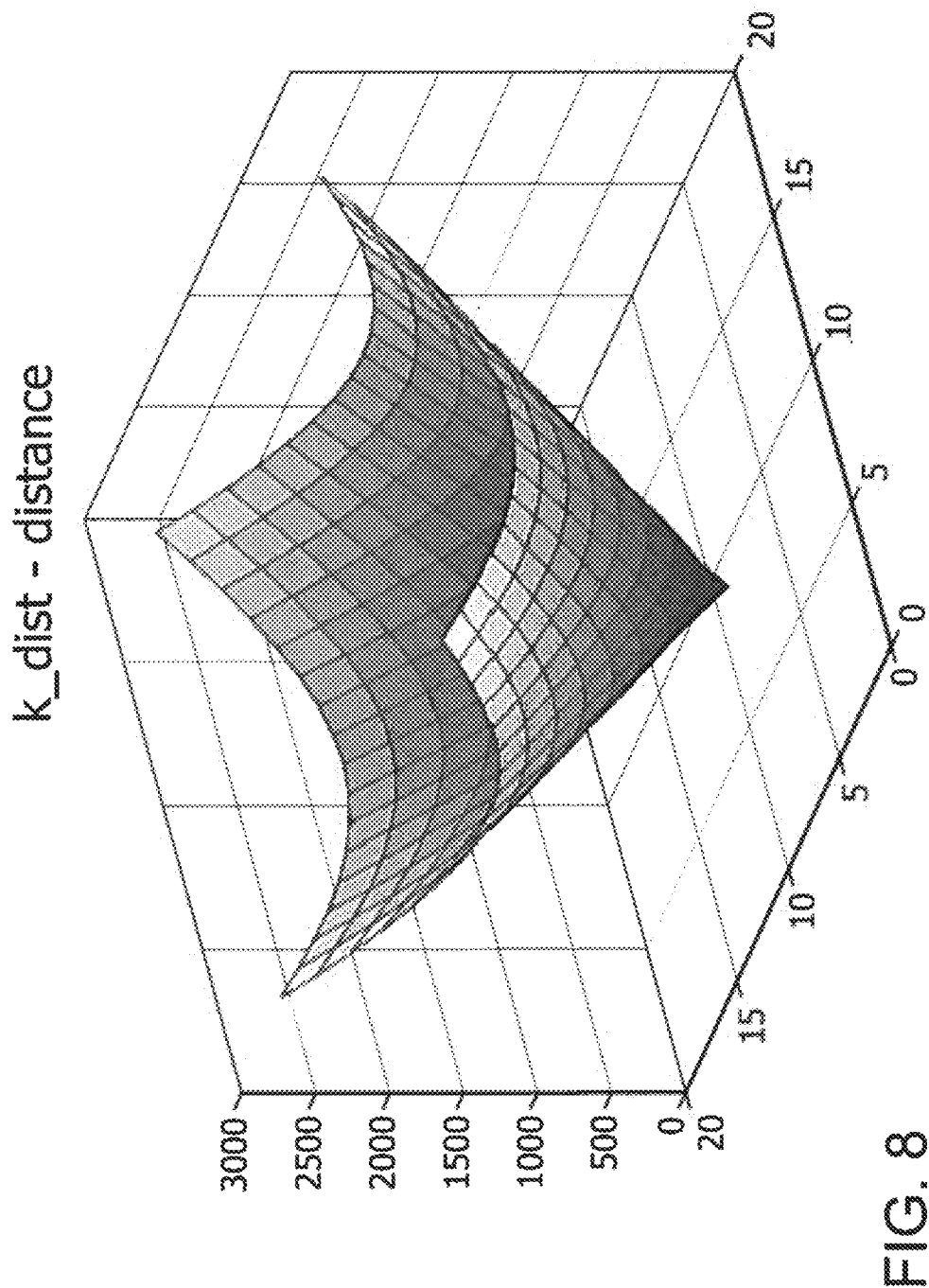
FIG. 8 is the 3D plot of the second term of equation (3) defined hereinafter.

The global motion estimated between the two frame is (0,0). FIG. 8 is the 3D plot of the second term, i.e. the distance, of equation (3); for the sake of simplicity, the distance term is a Euclidean distance although any other kind of distance is possible.

Figure 9:
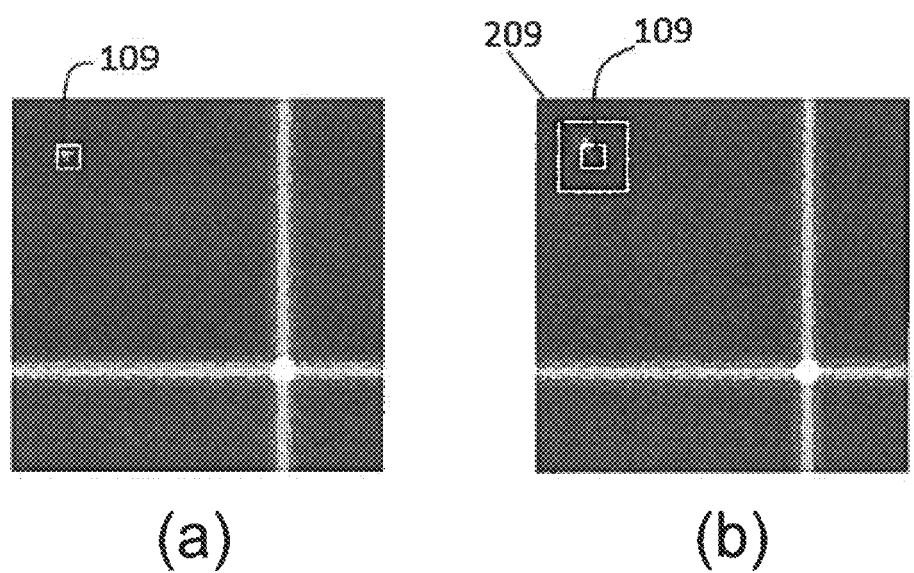
FIG. 9 shows a block in the reference frame and in the target frame.

It is to be noted that there is an offset between the reference systems of these images and the motion values so the motion values (0,0) correspond to the images point (9,9). FIG. 9 shows the block 109 in the reference frame (FIG. 9*a*), the same block 109 and the search window 209 in the target frame (FIG. 9*b*).

Figure 10:
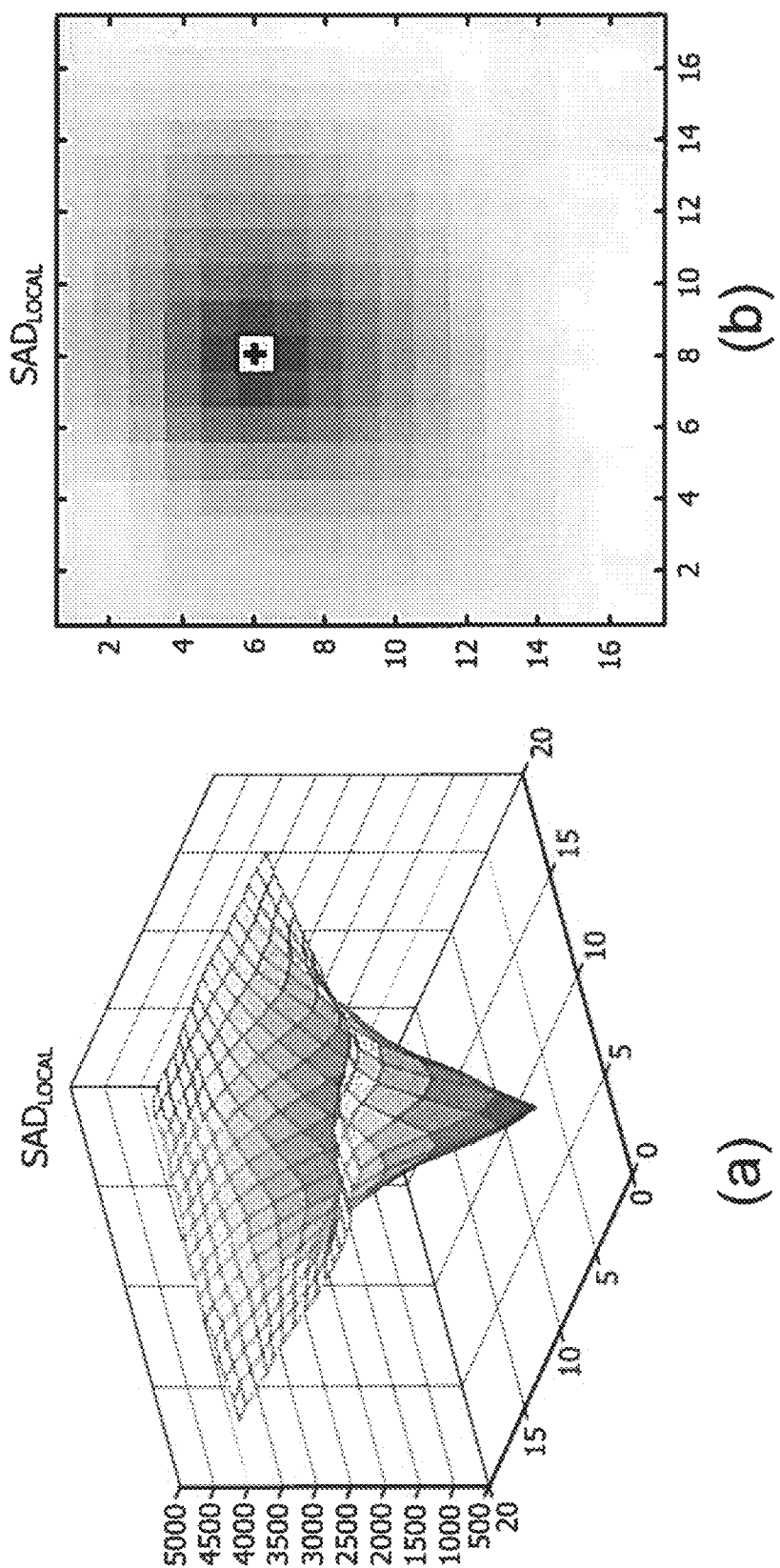
FIG. 10 is a plot of the SAD of the block of the previous figure, both in 3D and 2D with superimposed the minimum location.
Figure 11:
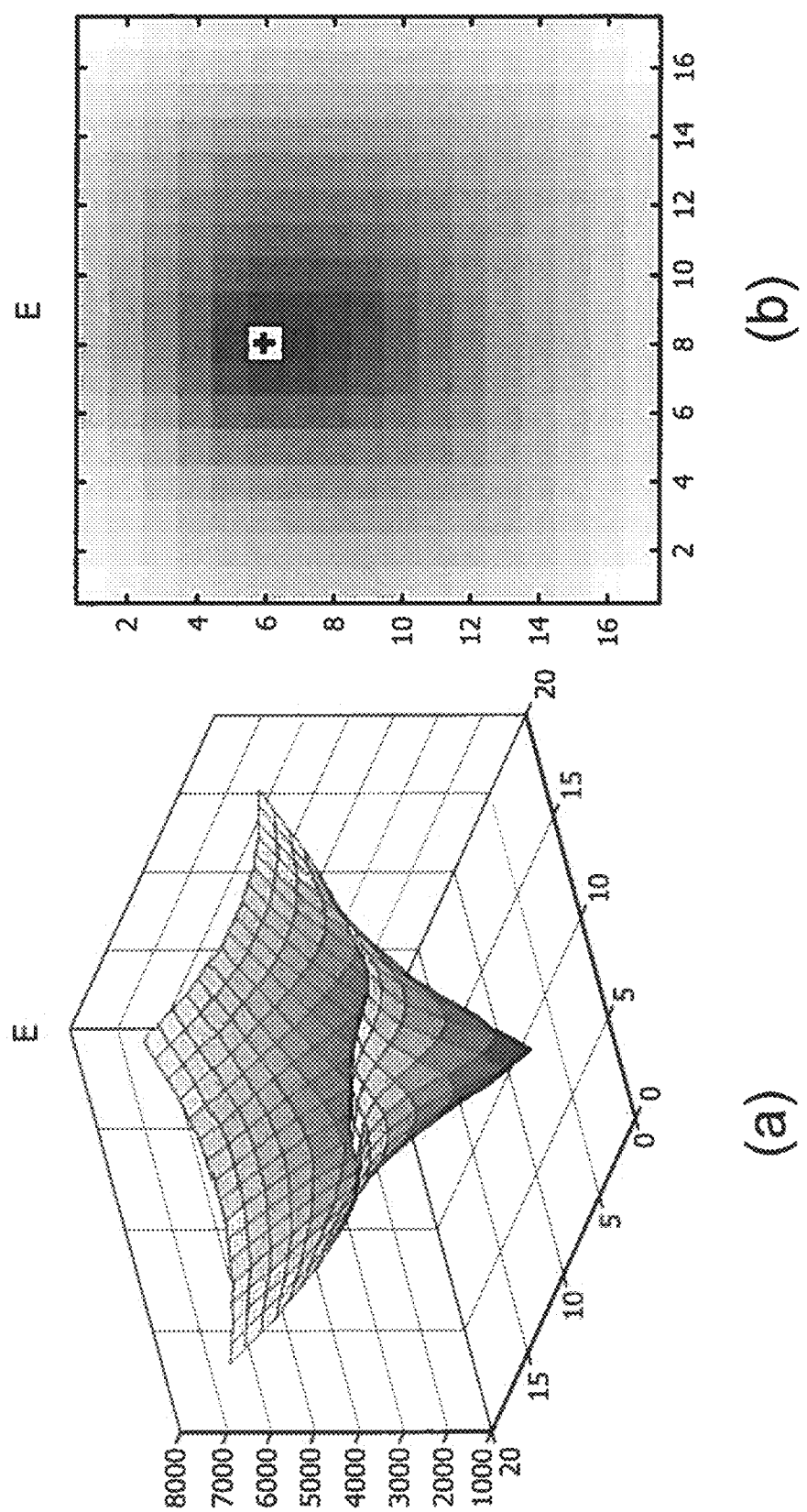
FIG. 11 is a plot of E(I, j) according to eq. (3) of the block of the previous figure, both in 3D and 2D with superimposed the minimum location.

FIG. 10 illustrates the SAD of the block (both in 3D (FIG. 10) and 2D (FIG. 10*b*) with superimposed the minimum location while FIG. 11 illustrates in the same format the quantity E of eq. (3). As it can be appreciated, the first term of the equation of E, corresponding to the local motion, "wins" in the sense that it renders almost neglectable the distance term.

Figure 12:
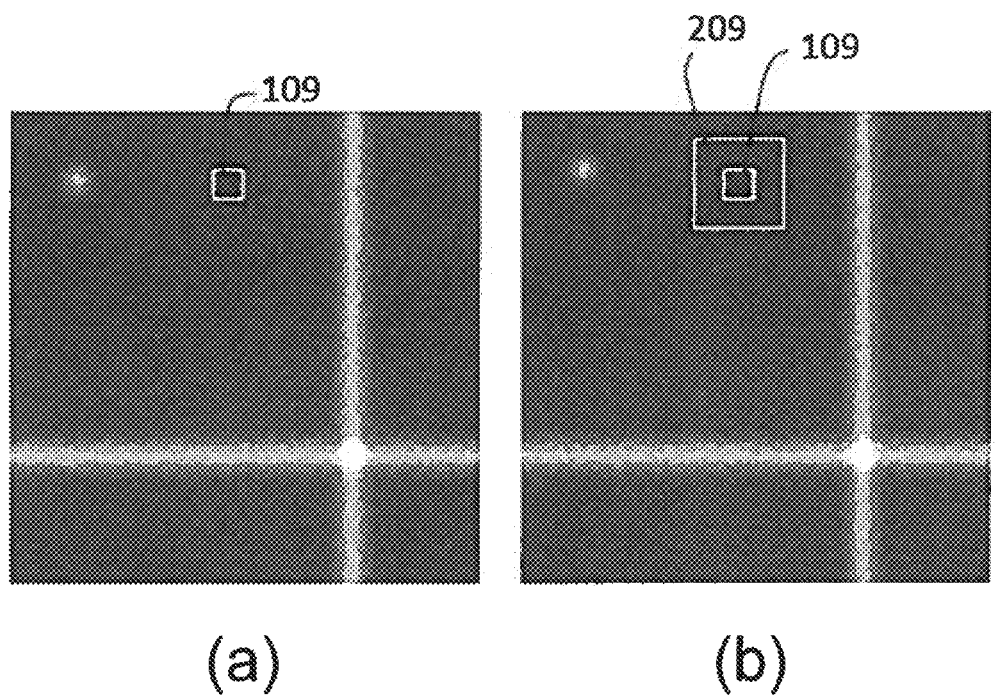
FIG. 12 shows a block in the reference frame and in the target frame in a position where the image content amounts only to noise.
Figure 13:
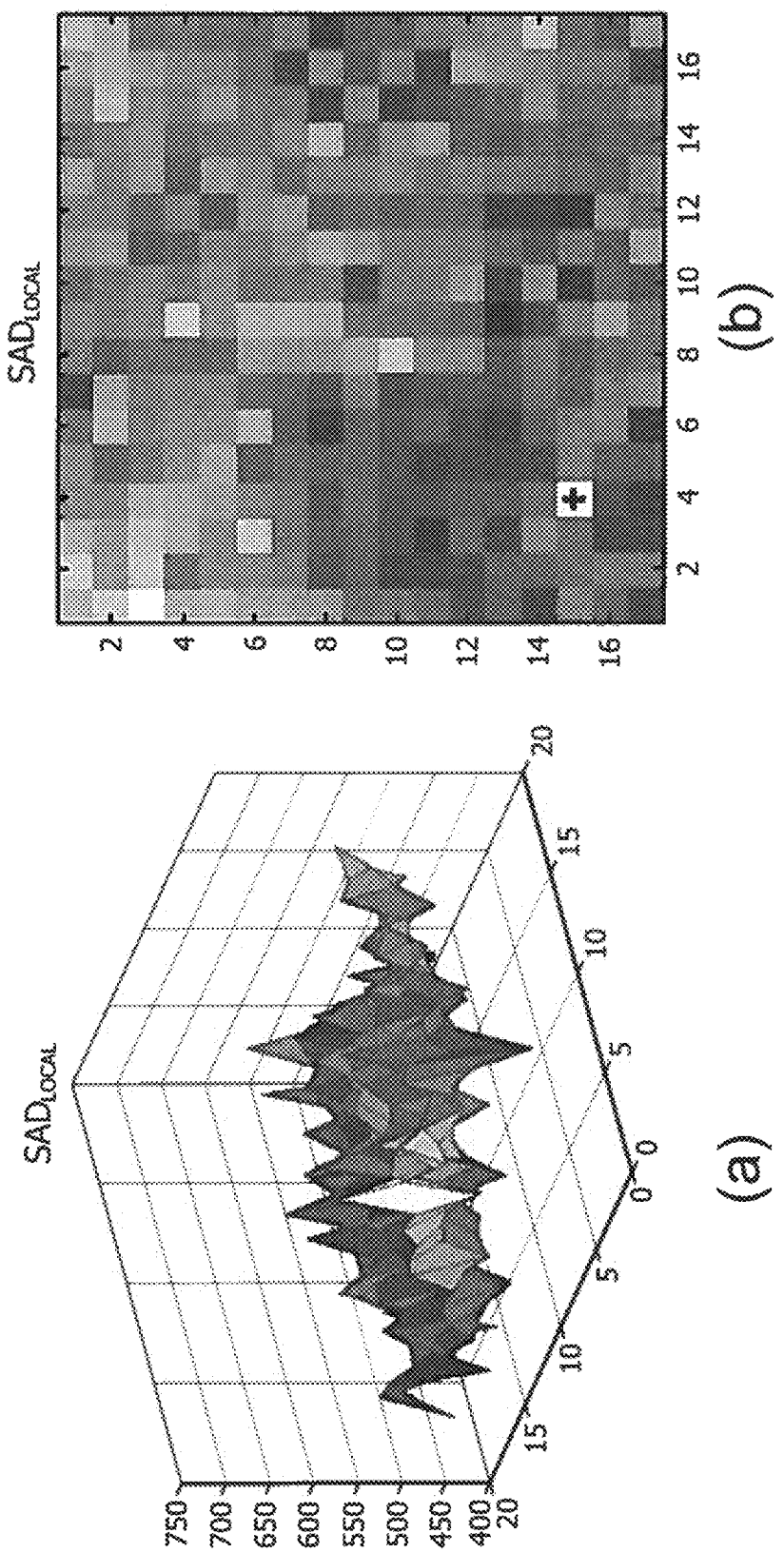
FIG. 13-14 are the same plots as FIG. 10-11 with reference to the block of FIG. 12.
Figure 14:
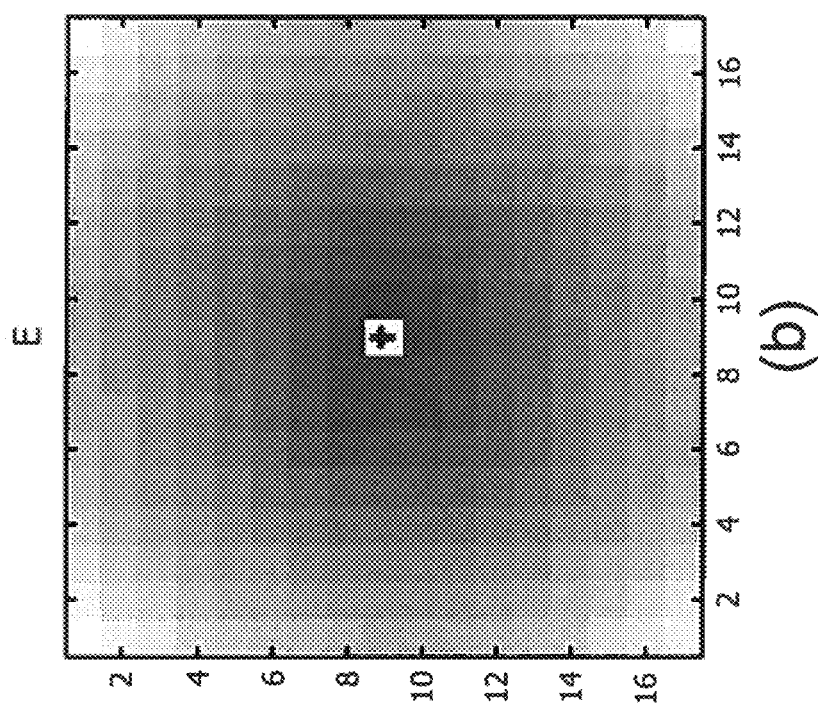
Figure 14:
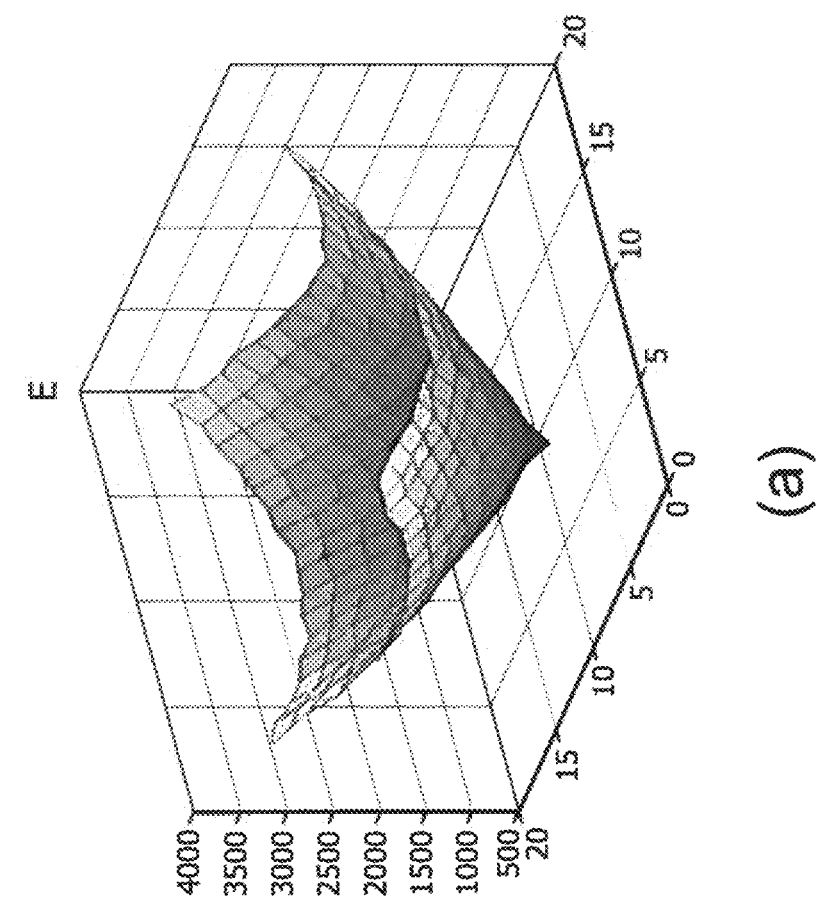

FIG. 12 is the same as FIG. 9 where a block 109 is shown in a position in which the image content is only noise. FIG. 13 shows the corresponding SAD of the block, both in 3D (a) and 2D (b) with superimposed the minimum location while FIG. 14 illustrates in the same format the quantity E of eq. (3). As it can be appreciated, the second term of the equation of E, i.e. the distance corresponding to the global motion, "wins", corresponding to the local motion, "wins" in the sense that renders almost neglectable the SAD term.

When all frames content is noise the global motion estimation gets a random result; this produces an output frame with a very annoying artifact.

In an embodiment, to overcome this issue, global motion estimation is bound to (0,0) by using a target function also for global motion similar to the one already explained:

$$E(i,j)=SAD_{GLOBAL}(i,j)+k\_dist\_0 \cdot distance((i,j),(0,0)) \quad (eq\ 4)$$

In this embodiment the estimated global motion ($i_{GLOBAL}$, $j_{GLOBAL}$) is the results of the minimization of the target function eq 4.

This equation has a behaviour similar to the previous one except that now, in case of noisy SAD, the estimated motion tends to be (0, 0).

The method described until here is general and can be applied to all fields in which is required to do motion estimation and/or compensation.

Now an embodiment is described that is specifically conceived to do motion estimation and compensation in particularly difficult situations in ultrasound spatial compounding.

An example is when the only informative content of the image sequence is originated from the false motion due to the varying insonation angle; this can produce some false estimation leading to a false motion along one of the two coordinate x or y.

To overcome these issues, a new term is introduced in the previous equations (eq 3 and eq 4), which term depends on an algorithm that detects this kind of false motion.

The two equations thus become:
1) for the global motion estimation:

$$E(i,j)=SAD_{GLOBAL}(i,j)+k\_dist\_0 \cdot distance((i,j),(0,0))+$$
$$k\_FMF\_global\_y \cdot distance((0,j),(0,0))+$$
$$k\_FMF\_global\_x \cdot distance((i,0),(0,0))) \quad (eq\ 5)$$

2) for the local motion estimation:

$$E(i,j)=SAD_{LOCAL}(i,j)+k\_dist \cdot distance((i,j),(i_{global}, j_{global}))+k\_FMF\_local\_y \cdot distance((0,j),(0, j_{global}))+k\_FMF\_local\_x \cdot distance((i,0),(i_{global},0))) \quad (eq\ 6)$$

Both the added terms depend only on the distance along y and along x, because the false motion can happen in these two direction in independent manner.

The general form for these terms is the following:

$$k\_FMF\_(global/local)\_(x/y)=k\_dist\_FMF\_(global/local) \cdot k\_dist\_FMF\_weight\_(x/y) \quad (eq\ 7)$$

where k_dist_FMF_global(/local) is a constant provided by the user and k_dist_FMF_weight_(x/y) is the result of the algorithm that detects false motion.

One or more processors and/or circuitry process the raw values of the estimated motion in both the x and y direction and detects when an unnatural pattern of motion happens; to do this an appropriate number of raw motion values are processed regarding the current and one or more past frame to detect some characteristics of the signal that are not present in a natural pattern: for example a large difference between positive and negative values, a large number of oscillation between positive and negative values, a large randomness, a strong periodicity, a large distance between the current value and the output of a predictor like a Kalman filter of other kind of linear or non-linear predictor.

When, for example, one or more of these conditions are true, the algorithm returns a value that tends to be higher depending on the level of confidence that each condition gets; when all conditions get a low level of confidence, the algorithm return a value that tends to be lower, at limit zero.

The application of the method as described until now in the different embodiments, produces an estimation of the motion for each block in which the frames are divided; this corresponds to a couple of value (x, y) for each block.

Starting from these values the motion estimation is extended to the entire frame with the purpose to obtain a value for each pixel of the frame, for example, by an interpolation that can be 1D or 2D depending on the shape and on the position of the blocks; different kind of interpolation can be used like a nearest-neighbour, linear (bilinear in 2D case), cubic (bicubic in 2D case), spline or each kind of interpolation that can construct new data values within the range of a discrete set of known data values.

For example in an embodiment regions of fixed height large as big as possible (depending on insonation angles and other geometric values) are used; in this case for each motion component a 1D interpolation of these values is done to obtain a vector of length equal to the frame height to be replicated for each image column.

After that the method uses these motion values to produce the motion-compensated frames by applying the proper estimated motion to remap a frame to another one; this can be done simply by moving each pixel of the punctual value of estimated motion.

Figure 15:
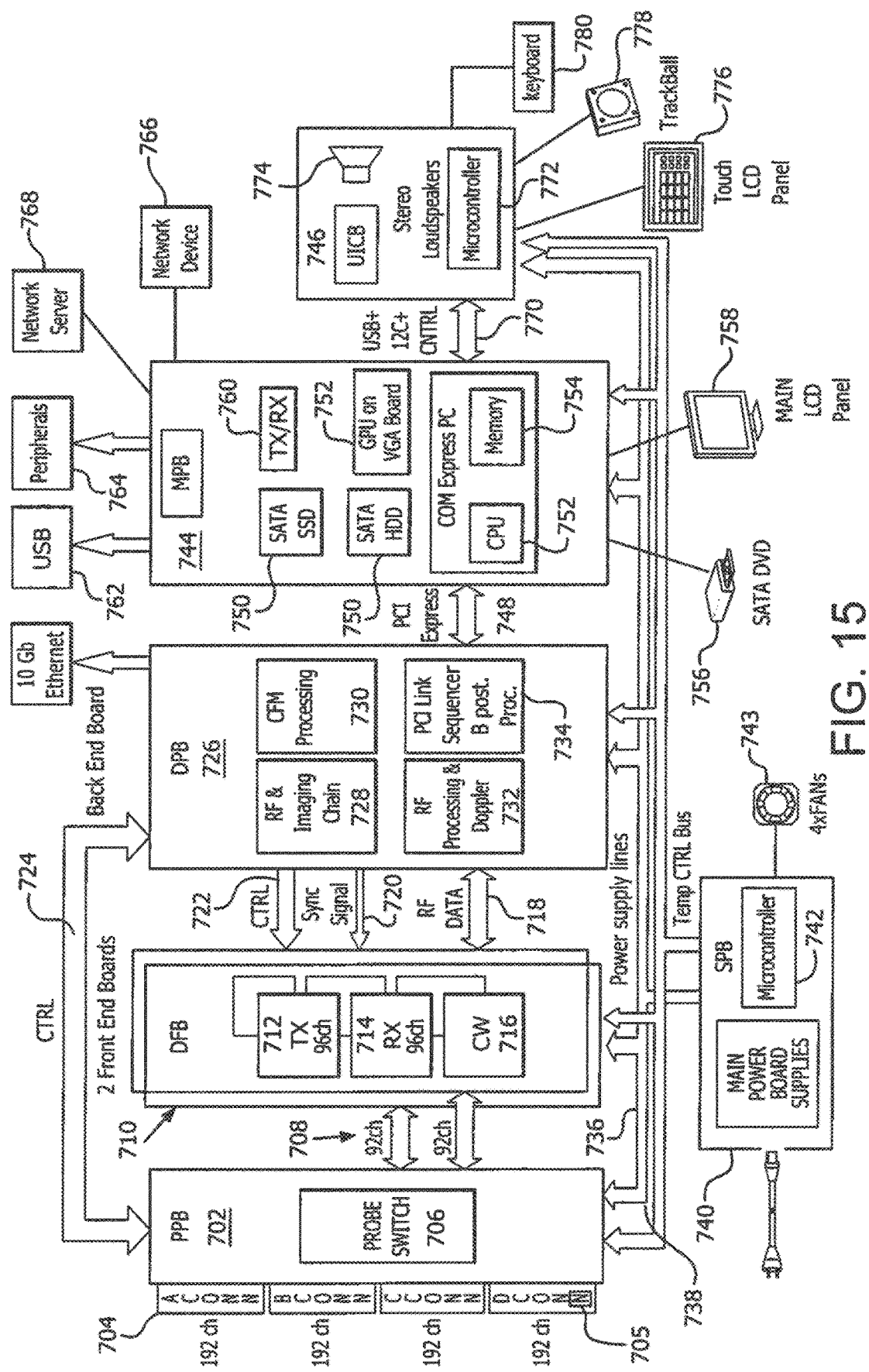
FIG. 15 illustrates a block diagram of an ultrasound system formed in accordance with an alternative embodiment.

FIG. 15 illustrates a block diagram of an ultrasound system formed in accordance with an alternative embodiment. The system of FIG. 15 implements the operations described herein in connection with various embodiments. By way of example, one or more circuits/processors within the system implement the operations of any processes illustrated in connection with the figures and/or described herein. The system includes a probe interconnect board 702 that includes one or more probe connection ports 704. The connection ports 704 may support various numbers of signal channels (e.g., 128, 192, 256, etc.). The connector ports 704 may be configured to be used with different types of probe arrays (e.g., phased array, linear array, curved array, 1D, 1.25D, 1.5D, 1.75D, 2D array, etc.). The probes may be configured for different types of applications, such as abdominal, cardiac, maternity, gynecological, urological and cerebrovascular examination, breast examination and the like.

One or more of the connection ports 704 may support acquisition of 2D image data and/or one or more of the connection ports 704 may support 3D image data. By way of example only, the 3D image data may be acquired through physical movement (e.g., mechanically sweeping or physician movement) of the probe and/or by a probe that electrically or mechanically steers the transducer array.

The probe interconnect board (FIB) 702 includes a switching circuit 706 to select between the connection ports 704. The switching circuit 706 may be manually managed based on user inputs. For example, a user may designate a connection port 704 by selecting a button, switch or other input on the system. Optionally, the user may select a connection port 704 by entering a selection through a user interface on the system.

Optionally, the switching circuit 706 may automatically switch to one of the connection ports 704 in response to detecting a presence of a mating connection of a probe. For example, the switching circuit 706 may receive a "connect" signal indicating that a probe has been connected to a select one of the connection ports 704. The connect signal may be generated by the probe when power is initially supplied to the probe when coupled to the connection port 704.

Additionally or alternatively, each connection port 704 may include a sensor 705 that detects when a mating connection on a cable of a probe has been interconnected with the corresponding connection port 704. The sensor 705 provides connect signal to the switching circuit 706, and in response thereto, the switching circuit 706 couples the corresponding connection port 704 to PIB outputs 708. Optionally, the sensor 705 may be constructed as a circuit with contacts provided at the connection ports 704. The circuit remains open when no mating connected is joined to the corresponding connection port 704. The circuit is closed when the mating connector of a probe is joined to the connection port 704.

A control line 724 conveys control signals between the probe interconnection board 702 and a digital processing board 724. A power supply line 736 provides power from a power supply 740 to the various components of the system, including but not limited to, the probe interconnection board (FIB) 702, digital front end boards (DFB) 710, digital processing board (DPB) 726, the master processing board (M PB) 744, and a user interface control board (UI CB) 746. A temporary control bus 738 interconnects, and provides temporary control signals between, the power supply 740 and the boards 702, 710, 726, 744 and 746. The power supply 740 includes a cable to be coupled to an external AC power supply. Optionally, the power supply 740 may include one or more power storage devices (e.g. batteries) that provide power when the AC power supply is interrupted or disconnected. The power supply 740 includes a controller 742 that manages operation of the power supply 740 including operation of the storage devices.

Additionally or alternatively, the power supply 740 may include alternative power sources, such as solar panels and the like. One or more fans 743 are coupled to the power supply 740 and are managed by the controller 742 to be turned on and off based on operating parameters (e.g. temperature) of the various circuit boards and electronic components within the overall system (e.g. to prevent overheating of the various electronics).

The digital front-end boards 710 providing analog interface to and from probes connected to the probe interconnection board 702. The DFB 710 also provides pulse or control and drive signals, manages analog gains, includes analog to digital converters in connection with each receive channel, provides transmit beamforming management and receive beamforming management and vector composition (associated with focusing during receive operations).

The digital front end boards 710 include transmit driver circuits 712 that generate transmit signals that are passed over corresponding channels to the corresponding transducers in connection with ultrasound transmit firing operations. The transmit driver circuits 712 provide pulse or control for each drive signal and transmit beamforming management to steer firing operations to points of interest within the region of interest. By way of example, a separate transmit driver circuits 712 may be provided in connection with each individual channel, or a common transmit driver circuits 712 may be utilized to drive multiple channels. The transmit driver circuits 712 cooperate to focus transmit beams to one or more select points within the region of interest. The transmit driver circuits 712 may implement single line transmit, encoded firing sequences, multiline transmitter operations, generation of shear wave inducing ultrasound beams as well as other forms of ultrasound transmission techniques.

The digital front end boards 710 include receive beamformer circuits 714 that received echo/receive signals and perform various analog and digital processing thereon, as well as phase shifting, time delaying and other operations in connection with beamforming. The beam former circuits 714 may implement various types of beamforming, such as single-line acquisition, multiline acquisition as well as other ultrasound beamforming techniques.

The digital front end boards 716 include continuous wave Doppler processing circuits 716 configured to perform continuous wave Doppler processing upon received echo signals. Optionally, the continuous wave Doppler circuits 716 may also generate continuous wave Doppler transmit signals.

The digital front-end boards 710 are coupled to the digital processing board 726 through various buses and control lines, such as control lines 722, synchronization lines 720 and one or more data bus 718.

The control lines 722 and synchronization lines 720 provide control information and data, as well as synchronization signals, to the transmit drive circuits 712, receive beamforming circuits 714 and continuous wave Doppler circuits 716. The data bus 718 conveys RF ultrasound data from the digital front-end boards 710 to the digital processing board 726. Optionally, the digital front end boards 710 may convert the RF ultrasound data to I,Q data pairs which are then passed to the digital processing board 726.

The digital processing board 726 includes an RF and imaging module 728, a color flow processing module 730, an RF processing and Doppler module 732 and a PCI link module 734. The digital processing board 726 performs RF filtering and processing, processing of black and white image information, processing in connection with color flow, Doppler mode processing (e.g. in connection with polls wise and continuous wave Doppler). The digital processing board 726 also provides image filtering (e.g. speckle reduction) and scanner timing control. The digital processing board 726 may include other modules based upon the ultrasound image processing functionality afforded by the system.

The modules 728-734 comprise one or more processors, DSPs, and/or FPGAs, and memory storing program instructions to direct the processors, DSPs, and/or FPGAs to perform various ultrasound image processing operations. The RF and imaging module 728 performs various ultrasound related imaging, such as B mode related image processing of the RF data. The RF processing and Doppler module 732 convert incoming RF data to I,Q data pairs, and performs Doppler related processing on the I, Q data pairs. Optionally, the imaging module 728 may perform B mode related image processing upon I, Q data pairs. The CFM processing module 730 performs color flow related image processing upon the ultrasound RF data and/or the I, Q data pairs. The PCI link 734 manages transfer of ultrasound data, control data and other information, over a PCI express bus 748, between the digital processing board 726 and the master processing board 744.

The master processing board 744 includes memory 750 (e.g. serial ATA solid-state devices, serial ATA hard disk drives, etc.), a VGA board 752 that includes one or more graphic processing unit (GPUs), one or more transceivers 760 one or more CPUs 752 and memory 754. The master processing board (also referred to as a PC board) provides user interface management, scan conversion and cine loop management. The master processing board 744 may be connected to one or more external devices, such as a DVD player 756, and one or more displays 758. The master processing board includes communications interfaces, such as one or more USB ports 762 and one or more ports 764 configured to be coupled to peripheral devices. The master processing board 744 is configured to maintain communication with various types of network devices 766 and various network servers 768, such as over wireless links through the transceiver 760 and/or through a network connection (e.g. via USB connector 762 and/or peripheral connector 764).

The network devices 766 may represent portable or desktop devices, such as smart phones, personal digital assistants, tablet devices, laptop computers, desktop computers, smart watches, ECG monitors, patient monitors, and the like. The master processing board 744 conveys ultrasound images, ultrasound data, patient data and other information and content to the network devices for presentation to the user. The master processing board 744 receives, from the network devices 766, inputs, requests, data entry and the like.

The network server 768 may represent part of a medical network, such as a hospital, a healthcare network, a third-party healthcare service provider, a medical equipment maintenance service, a medical equipment manufacturer, a government healthcare service and the like. The communications link to the network server 768 may be over the Internet, a private intranet, a local area network, a wide-area network, and the like.

The master processing board 744 is connected, via a communications link 770 with a user interface control board 746. The communications link 770 conveys data and information between the user interface and the master processing board 744. The user interface control board 746 includes one or more processors 772, one or more audio/video components 774 (e.g. speakers, a display, etc.). The user interface control board 746 is coupled to one or more user interface input/output devices, such as an LCD touch panel 776, a trackball 778, a keyboard 780 and the like. The processor 772 manages operation of the LCD touch panel 776, as well as collecting user inputs via the touch panel 776, trackball 778 and keyboard 780, where such user inputs are conveyed to the master processing board 744 in connection with implementing embodiments herein.

Figure 16:
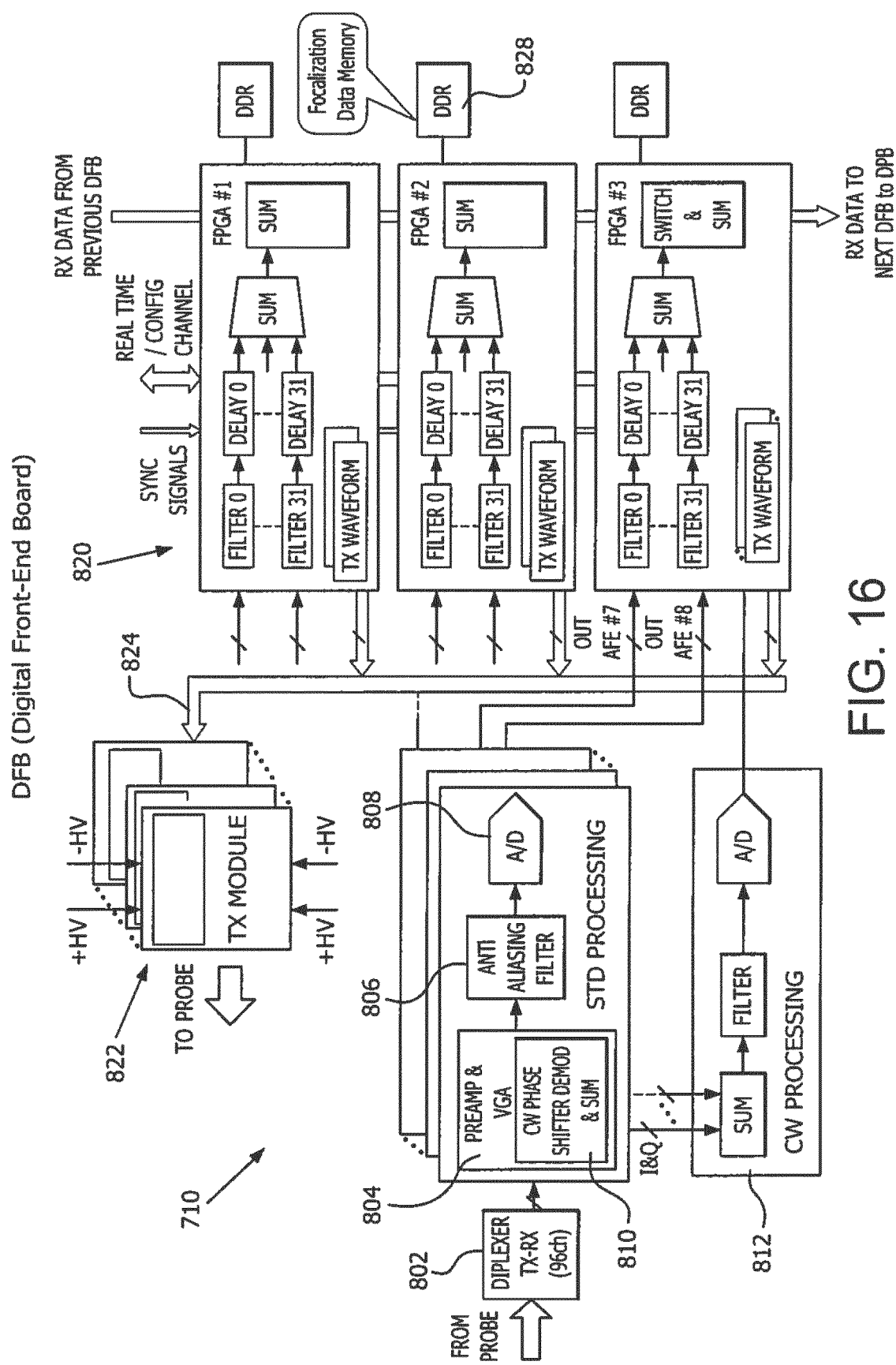
FIG. 16 illustrates a block diagram of a portion of the digital front-end boards.

FIG. 16 illustrates a block diagram of a portion of the digital front-end boards 710 formed in accordance with embodiments herein. A group of diplexers 802 receive the ultrasound signals for the individual channels over the PIB output 808. The ultrasound signals are passed along a standard processing circuit 805 or to a continuous wave processing circuit 812, based upon the type of probing utilized. When processed by the standard processing circuit 805, a preamplifier and variable gain amplifier 804 process the incoming ultrasound receive signals that are then provided to an anti-aliasing filter 806 which performs anti-aliasing filtering. The output thereof is provided to an A/D converter 808 that digitizes the incoming analog ultrasound receive signals. When a continuous wave (CW) probe is utilized, the signals therefrom are provided to a continuous wave phase shifter, demodulator and summer 810 which converts the analog RF receive signals to I,Q data pairs. The CW I,Q data pairs are summed, filtered and digitized by a continuous wave processing circuit 812. Outputs from the standard or continuous wave processing circuits 805, 812 are then passed to beam forming circuits 820 which utilize one or more FPGAs to perform filtering, delaying and summing the incoming digitized receive signals before passing the RF data to the digital processing board 826 (FIG. 7). The FPGAs receive focalization data from memories 828. The focalization data is utilized to manage the filters, delays and summing operations performed by the FPGAs in connection with beamforming. The being formed RF data is passed between the beamforming circuits 820 and ultimately to the digital processing board 726.

The digital front-end boards 710 also include transmit modules 822 that provide transmit drive signals to corresponding transducers of the ultrasound probe. The beamforming circuits 820 include memory that stores transmit waveforms. The transmit modules 822 receive transmit waveforms over line 824 from the beamforming circuits 820.

Figure 17:
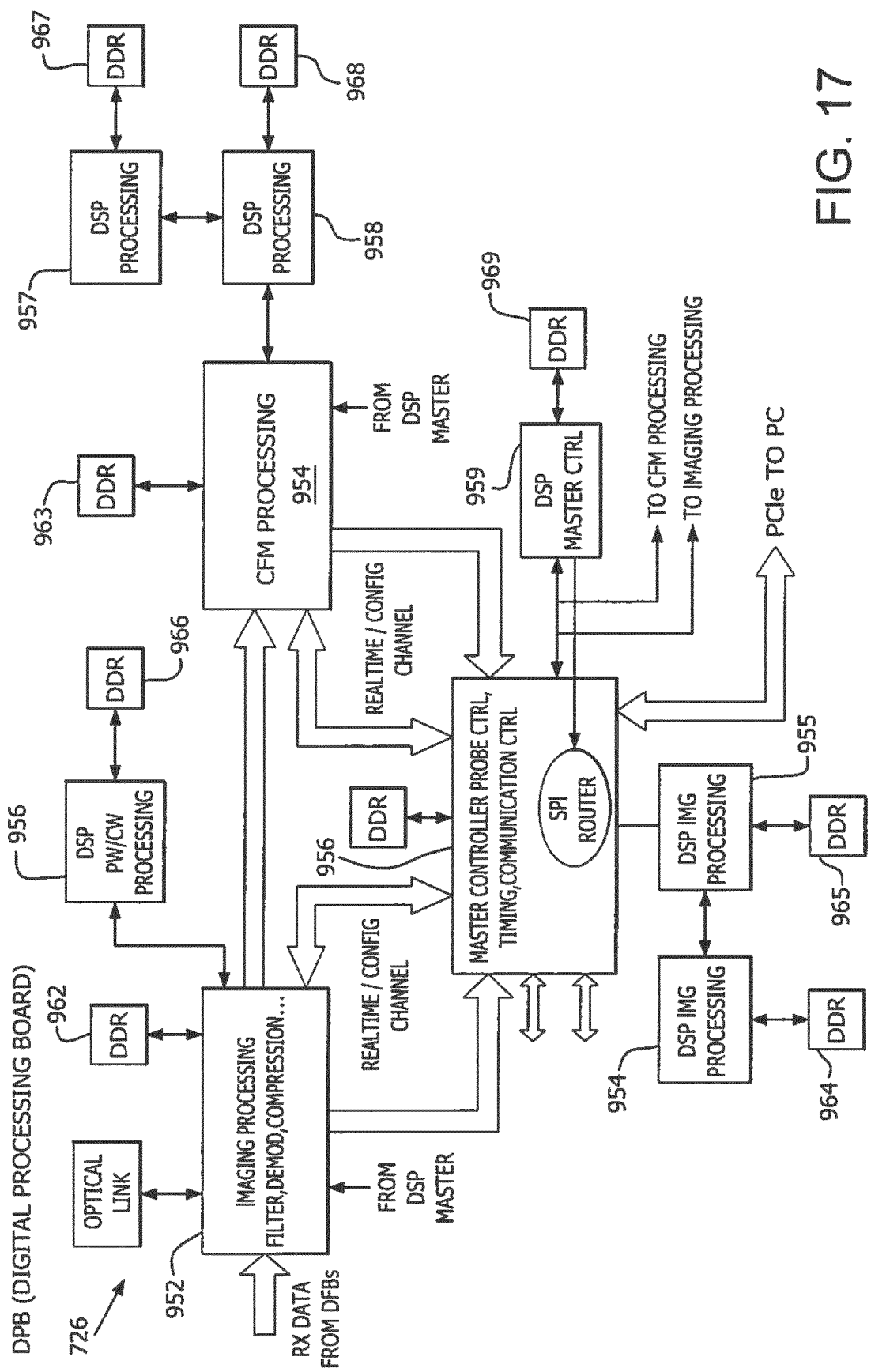
FIG. 17 illustrates a block diagram of the digital processing board.

FIG. 17 illustrates a block diagram of the digital processing board 726 implemented in accordance with embodiments herein. The digital processing board 726 includes various processors 952-959 to perform different operations under the control of program instructions saved within corresponding memories see 962-969. A master controller 950 manages operation of the digital processing board 726 and the processors 952-959. By way of example, one or more processors as the 952 may perform filtering, compounding, the modulation, compression and other operations, while another processor 953 performs color flow processing. The master controller provides probe control signals, timing control signals, communications control and the like. The master controller 950 provides real-time configuration information and synchronization signals in connection with each channel to the digital front-end board 710.

Figure 18:
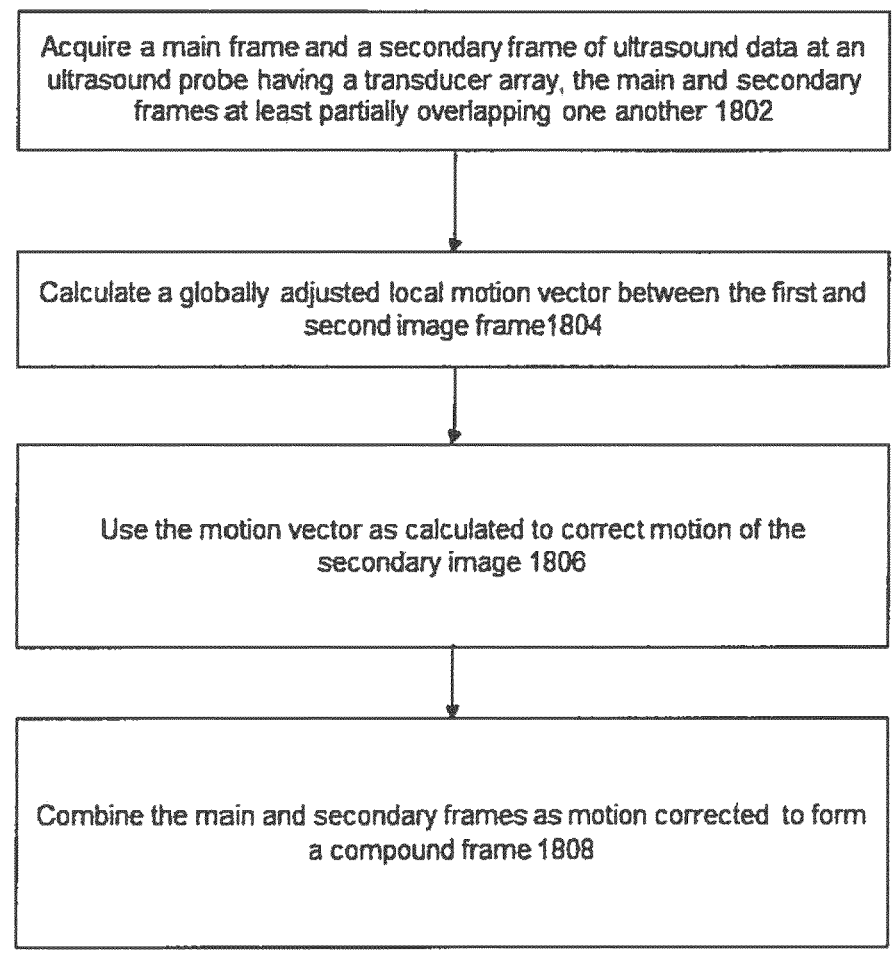
FIG. 18 illustrates a block diagram of a compound imaging module formed in accordance with embodiments herein.

FIG. 18 illustrates a method for performing compound imaging in accordance with embodiments herein. The operations may be carried out by one or more processors of an ultrasound system in response to execution of program instructions stored in the memory of the ultrasound system. The operations of FIG. 18 may be carried out by one or more digital signal processors (DSPs), field programmable gate arrays (FPGAs) and/or other hardware or firmware components. Additionally or alternatively, the operations of FIG. 18 may be carried out by the processors within one or more servers, on a network, in response to execution of program instructions stored at the server, and/or other applications stored at the server.

At 1802 a main frame and a secondary frame of ultrasound data representative of an ultrasound image are acquired at an ultrasound probe having a transducer array. The main and secondary frames are at least partially overlapping one another. For example, one or more processors, beamformers and other hardware and software manage transmission and reception of ultrasound signals to acquire ultrasound echo signals representative of at least a portion of a patient (e.g., human or animal).

At 1804 a processor or hardware based module performs a motion vector estimation between the first and second frame considering global and local motion functions as seen above. They may comprise a SAD, NCC or any other type of relation allowing to determine how pixels or block of pixels move from one frame to another due to motion.

To the extent that operations are described herein to be based on vectors or other information it is recognized that such operations are based in part on the vector or other information and that such operations may be based on additional criteria.

For example, global and local SAD are calculated to determine a global motion vector and a local motion vector. To correct artifacts typical of ultrasound compound images, the global motion vector is considered in the local motion vector calculation to obtain a globally corrected motion vector.

At 1806 the processor or hardware based module uses the globally corrected motion vector to correct motion of the secondary image.

At 1808 the processor or hardware based compounding module combines the main frame and the secondary motion-corrected frame to form a compound image.

The acquiring operation common to various embodiments may utilize a transducer array with a linear surface or a convex array with a curved surface.

A system for carrying out the above operations may have the same configuration as the system disclosed in the description with reference to FIGS. 1, 2, 15, 16 and 17 by providing the beamformer and the processor with a software allowing to carry out lateral steering on the transmitted waves and on the received waves.

In combination the lateral steering can be carried out in such a way as to generate secondary frames according to the present invention and the embodiments disclosed herein.

It should be clearly understood that the various arrangements and processes broadly described and illustrated with respect to the figures, and/or one or more individual components or elements of such arrangements and/or one or more process operations associated of such processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate.

Aspects are described herein with reference to the Figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified. The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

One or more of the operations described above in connection with the methods may be performed using one or more processors. The different devices in the systems described herein may represent one or more processors, and two or more of these devices may include at least one of the same processors. In one embodiment, the operations described herein may represent actions performed when one or more processors (e.g., of the devices described herein) execute program instructions stored in memory (for example, software stored on a tangible and non-transitory computer readable storage medium, such as a computer hard drive, ROM, RAM, or the like).

The processor(s) may execute a set of instructions that are stored in one or more storage elements, in order to process data. The storage elements may also store data or other information as desired or needed. The storage element may be in the form of an information source or a physical memory element within the controllers and the controller device. The set of instructions may include various commands that instruct the controllers and the controller device to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

The controller may include any processor-based or microprocessor-based system including systems using microcontrollers, reduced instruction set computers (RISC), application specific integrated circuitry (ASICs), field-programmable gate arrays (FPGAs), logic circuitry, and any other circuit or processor capable of executing the functions described herein. When processor-based, the controller executes program instructions stored in memory to perform the corresponding operations. Additionally or alternatively, the controllers and the controller device may represent circuitry that may be implemented as hardware. The above examples are exemplary only, and are thus not intended to limit in any way the definition and/or meaning of the term "controller."

Optionally, aspects of the processes described herein may be performed over one or more networks one a network server. The network may support communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The embodiments described herein may include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Various embodiments may further include receiving, sending, or storing instructions and/or data implemented in accordance with the foregoing description upon a computer-readable medium. Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

Although being disclosed mainly with reference to ultrasound compound images, the motion compensation technique herein disclosed can be used also in other type of image processing, particularly where moving images are to be somehow combined, for example in differential contrast imaging techniques, persistence processing or the like. Ultrasounds is not the only imaging modality that can take advantage of the present teachings. X-ray, MRI, SPECT, TC images can be equally employed as well as video images also in non-medical fields such as video compression, video-object segmentation, video content analysis and frame interpolation or application in which the "motion" between image can be only apparent like in image registration or stereo correspondence in 3D.

The invention claimed is:

1. A computer-implemented method for estimating motion between images associated with a common region of interest, the method comprising:
providing frames including a reference frame and a target frame that correspond to respective images and have pixels;
for a macro-block corresponding to a substantial majority of the pixels of the reference frame, estimating a global motion vector between the reference frame and the target frame;
for each of a plurality of blocks that are corresponding portions of pixels in the reference frame, estimating respective local motion vectors between the reference frame and the target frame based on the global motion vector to form globally adjusted local motion vectors;
considering the globally adjusted local motion vectors as motion estimator.

2. The method of claim 1, wherein motion-compensated images, particularly compound images, are generated by combining the reference and target frames based on the globally adjusted local motion vectors.

3. The method according to claim 1, wherein the estimating global motion vector includes calculating a function correlating a macro-block in the reference frame with a plurality of candidate displacements of the macro-block in the target frame and optimizing such function to identify which of the displacements estimates the global motion vector.

4. The method according to claim 1, wherein the estimating local motion vectors includes calculating a function correlating a block of the reference frame with a plurality of candidate displacements of the block in the target frame and optimizing such function to identify which of the displacements estimates the local motion vector, the function comprising a distance relation between the candidate displacement and the global motion vector.

5. The method according to claim 1, wherein the function to estimate global and/or local motion vectors is a sum of absolute differences to be minimized or a normalized cross-correlation to be maximized.

6. The method according to claim 1, wherein the determining global motion vector operation includes calculating a cost function between a macro-block in the reference frame and a plurality of displacements of the macro-block in the target frame and adjusting the function by a term that depends on the distance between the null displacement and the candidate displacement.

7. The method according to claim 1, wherein the function to estimate global and/or local motion vectors is modified by introducing a term related to an unnatural pattern of motion.

8. The method according to claim 7, wherein the term is based on the outcome of a processing operation of a number of motion values in the reference and the target frames to detect artifacts that are not present in a natural motion pattern.

9. A method according to claim 1, wherein the frames are frames of ultrasound data acquired with an ultrasound system at an ultrasound probe having a transducer array.

10. The method according to claim 1, wherein the images are video images.

11. A method for generating a motion-compensated compound image with an ultrasound system, the method comprising:
acquiring frames of ultrasound data at an ultrasound probe having a transducer array, the frames including a reference frame and a target frame associated with a common region of interest;
for a macro-block corresponding to a substantial majority of the reference frame, estimating a global motion vector between the reference frame and the target frame;
for each of a plurality of blocks that are corresponding portions of pixels in the reference frame, estimating respective local motion vectors between the reference frame and the target frame based on the global motion vector to form globally adjusted local motion vectors; and combining the reference and target frames based on the globally adjusted local motion vectors to form a compound image.

12. A method according to claim 11, wherein a term correcting unnatural pattern of motion, typically due to the varying insonation angle used for subsequent frames in spatial compounding, is introduced in the function for estimating global and/or local motion.

13. A computer product directly loadable into the memory of a digital computer and comprising software code portions for performing the method according to claim 1 when the product is run on a computer.

14. An ultrasound system for performing motion-compensated compound imaging, the system comprising:
an ultrasound probe having a transducer array to acquire ultrasound data;
a beamformer to form frames from the ultrasound data, the frames including a reference frame and a target frame associated with a common region of interest;
circuitry configured to:
for a macro-block corresponding to a substantial majority of the reference frame, estimate a global motion vector between the reference frame and the target frame;
for each of a plurality of blocks that are corresponding portions of pixels in the reference frame, estimate respective local motion vectors between the reference frame and the target frame based on the global motion vector to form globally adjusted local motion vectors; and
combine the reference and target frames based on the globally adjusted local motion vectors to form a compound image.

15. The system according to claim 14, wherein the circuitry comprises one or more processors that, when executing program instructions, are configured to perform at least one of the estimate, adjust and combine operations.

16. The system of claim 14, wherein the estimating operation includes calculating by the circuitry a function correlating a block of the reference frame with a plurality of candidate displacements of the block in the target frame and optimizing such function to identify which of the displacements estimates the motion vector, the function for estimating local motion vectors comprising a distance relation between the candidate displacement and the global motion vector.

17. The system according to claim 14, wherein the estimating operation includes calculating by the circuitry a sum of absolute differences (SAD) or a normalized cross-correlation (NCC) between a reference block in the reference frame and the candidate blocks in the target frame and utilizing the SAD that has a minimum value and/or the NCC that has a maximum value to estimate the global motion vector.

18. The system according to claim 14, wherein the circuitry is configured to perform the method according to claim 1.

* * * * *